US012669619B2

(12) United States Patent
Xiao et al.

(10) Patent No.: US 12,669,619 B2
(45) Date of Patent: Jun. 30, 2026

(54) CLOCK ERROR PREDICTION METHOD AND APPARATUS

(71) Applicant: Huawei Technologies Co., Ltd., Shenzhen (CN)

(72) Inventors: Yang Xiao, Shanghai (CN); Guosheng Huang, Shanghai (CN); Yongfeng Guo, Shanghai (CN); Guanzhong Tan, Shenzhen (CN); Yongxiang Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 363 days.

(21) Appl. No.: 18/262,596

(22) PCT Filed: Dec. 23, 2021

(86) PCT No.: PCT/CN2021/140946
§ 371 (c)(1),
(2) Date: Jul. 24, 2023

(87) PCT Pub. No.: WO2022/156480
PCT Pub. Date: Jul. 28, 2022

(65) Prior Publication Data
US 2024/0151857 A1 May 9, 2024

(30) Foreign Application Priority Data
Jan. 25, 2021 (CN) .......................... 202110099422.9

(51) Int. Cl.
*G01S 19/37* (2010.01)

(52) U.S. Cl.
CPC .................................... *G01S 19/37* (2013.01)

(58) Field of Classification Search
None
See application file for complete search history.

(56) References Cited

U.S. PATENT DOCUMENTS 6,542,820 B2   4/2003   Lamance et al.
8,004,462 B2   8/2011   Lamance et al.
(Continued)

FOREIGN PATENT DOCUMENTS

CN   105182374 A   12/2015
CN   108107455 A   6/2018
(Continued)

*Primary Examiner* — Whitney Moore
(74) *Attorney, Agent, or Firm* — Conley Rose, P.C.

(57) ABSTRACT

A clock error prediction method includes: obtaining historical satellite clock error data of a preset time period which includes broadcast ephemeris clock error data and precise ephemeris clock error data; obtaining corrected precise ephemeris clock error data based on the broadcast ephemeris clock error data; obtaining a single-day clock speed of each satellite through fitting based on single-day clock error data in the corrected precise ephemeris clock error data of each satellite; obtaining a clock speed time sequence of each satellite based on the single-day clock speed of each satellite; obtaining a clock speed change rate of each satellite through fitting based on the clock speed time sequence of each satellite; and obtaining a predicted clock error of each satellite in a preset future time period based on an initial clock error value, a clock speed, and the clock speed change rate of each satellite.

21 Claims, 11 Drawing Sheets

(56)     References Cited

U.S. PATENT DOCUMENTS

| | | | | |
|---|---|---|---|---|
| 2009/0237300 A1* | 9/2009 | Han | .................. | G01S 19/27 |
| | | | | 342/357.66 |
| 2016/0187488 A1* | 6/2016 | Chong | .................. | G01S 19/25 |
| | | | | 342/357.64 |

FOREIGN PATENT DOCUMENTS

| | | | |
|---|---|---|---|
| CN | 110058287 A | 7/2019 |
| CN | 110376620 A | 10/2019 |
| CN | 111413719 A | 7/2020 |
| CN | 111580132 A | 8/2020 |
| EP | 3164796 B1 | 2/2022 |
| WO | 2008100956 A1 | 8/2008 |

* cited by examiner

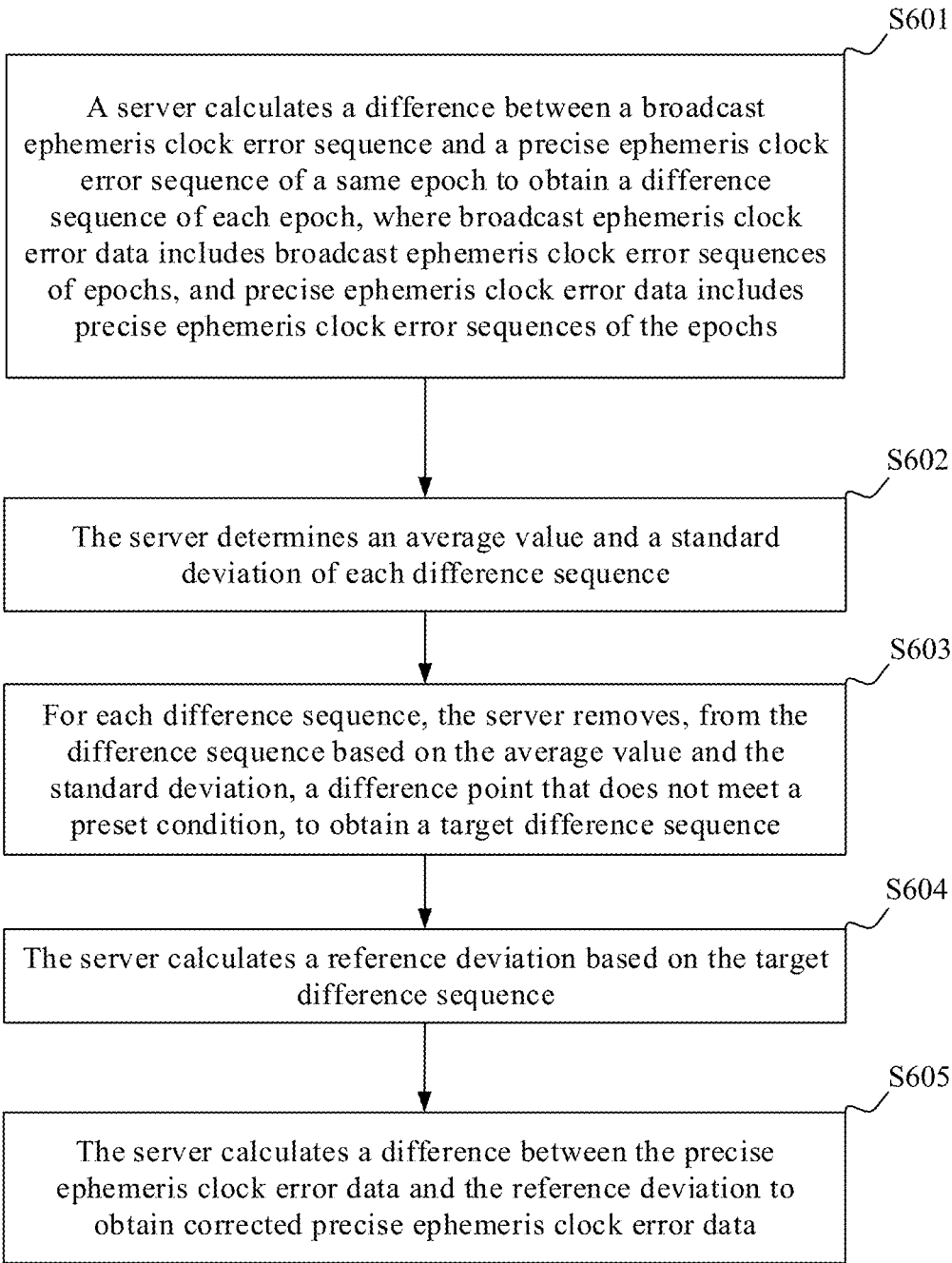

A server calculates a difference between a broadcast ephemeris clock error sequence and a precise ephemeris clock error sequence of a same epoch to obtain a difference sequence of each epoch, where broadcast ephemeris clock error data includes broadcast ephemeris clock error sequences of epochs, and precise ephemeris clock error data includes precise ephemeris clock error sequences of the epochs

S601

The server determines an average value and a standard deviation of each difference sequence

S602

For each difference sequence, the server removes, from the difference sequence based on the average value and the standard deviation, a difference point that does not meet a preset condition, to obtain a target difference sequence

S603

The server calculates a reference deviation based on the target difference sequence

S604

The server calculates a difference between the precise ephemeris clock error data and the reference deviation to obtain corrected precise ephemeris clock error data

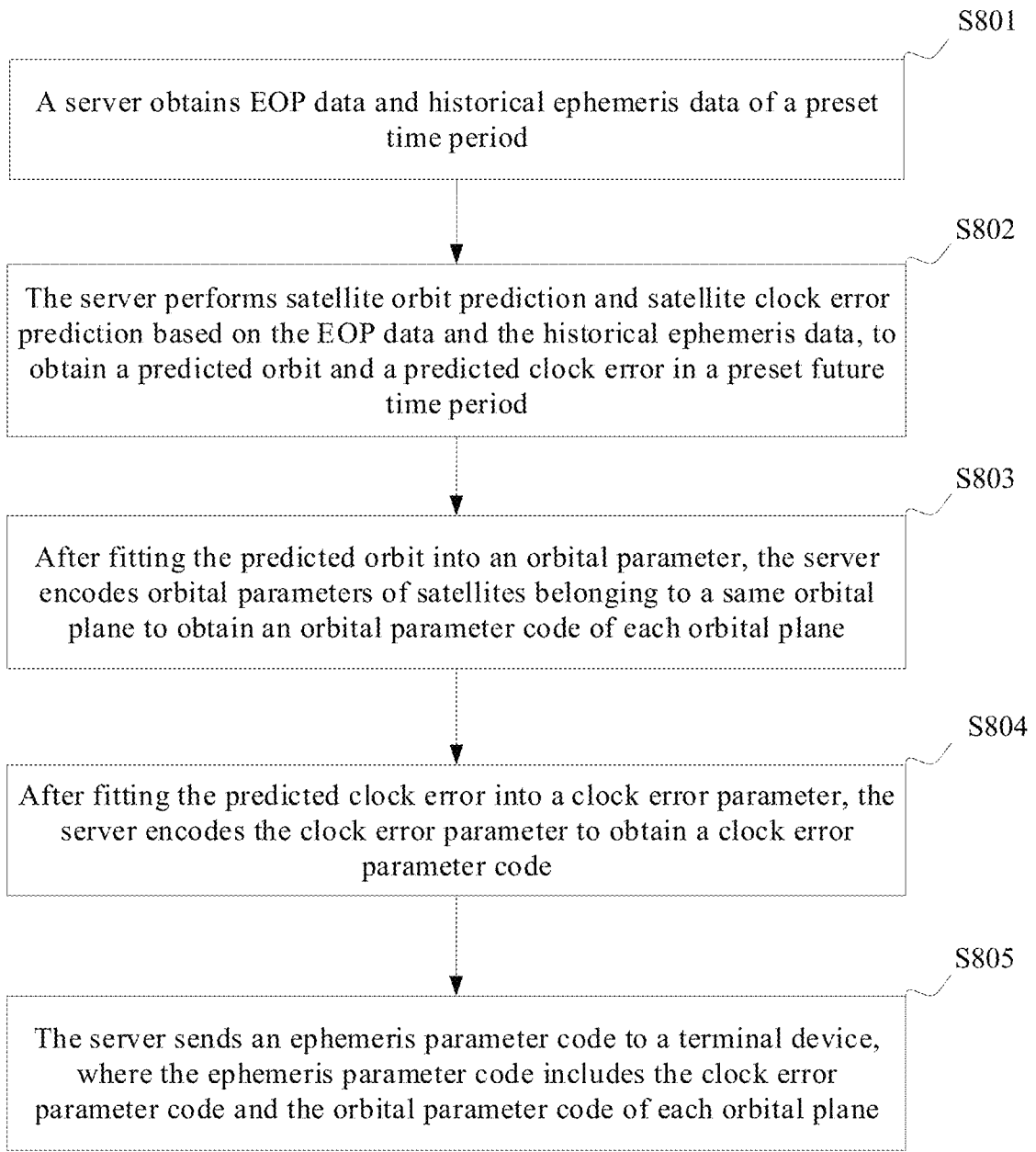

S801

A server obtains EOP data and historical ephemeris data of a preset time period

S802

The server performs satellite orbit prediction and satellite clock error prediction based on the EOP data and the historical ephemeris data, to obtain a predicted orbit and a predicted clock error in a preset future time period

S803

After fitting the predicted orbit into an orbital parameter, the server encodes orbital parameters of satellites belonging to a same orbital plane to obtain an orbital parameter code of each orbital plane

S804

After fitting the predicted clock error into a clock error parameter, the server encodes the clock error parameter to obtain a clock error parameter code

S805

The server sends an ephemeris parameter code to a terminal device, where the ephemeris parameter code includes the clock error parameter code and the orbital parameter code of each orbital plane

FIG. 8

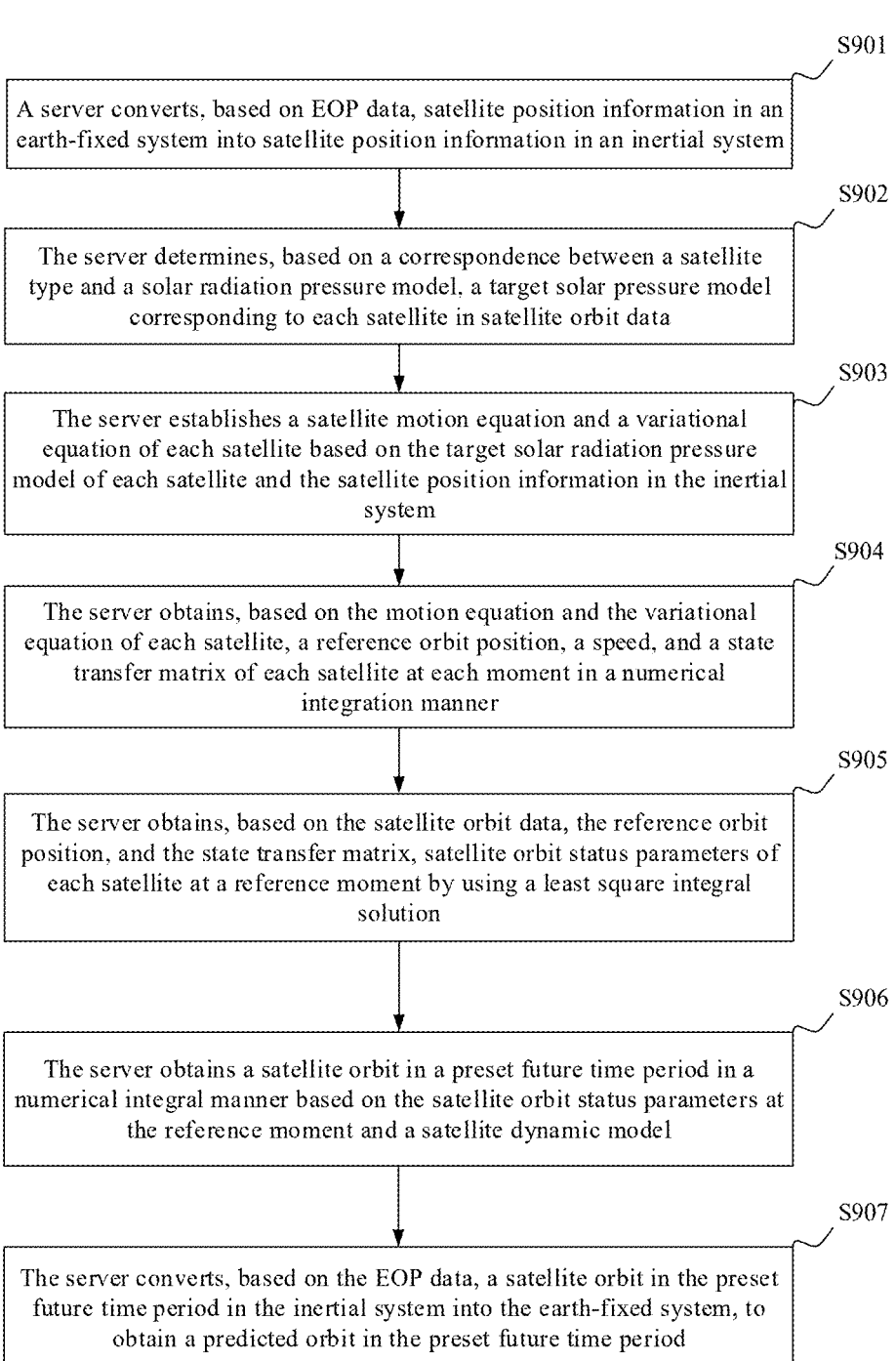

S901

A server converts, based on EOP data, satellite position information in an earth-fixed system into satellite position information in an inertial system

S902

The server determines, based on a correspondence between a satellite type and a solar radiation pressure model, a target solar pressure model corresponding to each satellite in satellite orbit data

S903

The server establishes a satellite motion equation and a variational equation of each satellite based on the target solar radiation pressure model of each satellite and the satellite position information in the inertial system

S904

The server obtains, based on the motion equation and the variational equation of each satellite, a reference orbit position, a speed, and a state transfer matrix of each satellite at each moment in a numerical integration manner

S905

The server obtains, based on the satellite orbit data, the reference orbit position, and the state transfer matrix, satellite orbit status parameters of each satellite at a reference moment by using a least square integral solution

S906

The server obtains a satellite orbit in a preset future time period in a numerical integral manner based on the satellite orbit status parameters at the reference moment and a satellite dynamic model

S907

The server converts, based on the EOP data, a satellite orbit in the preset future time period in the inertial system into the earth-fixed system, to obtain a predicted orbit in the preset future time period

FIG. 9

CLOCK ERROR PREDICTION METHOD AND APPARATUS

CROSS-REFERENCE TO RELATED APPLICATIONS

This is a U.S. National Stage of International Patent Application No. PCT/CN2021/140946 filed on Dec. 23, 2021, which claims priority to Chinese Patent Application No. 202110099422.9 filed on Jan. 25, 2021. All of the aforementioned applications are hereby incorporated by reference in their entireties.

TECHNICAL FIELD

This application relates to the field of satellite navigation technologies, and in particular, to a clock error prediction method and apparatus.

BACKGROUND

At present, a global navigation satellite system (Global Navigation Satellite System, GNSS) is required for terminal positioning. Specifically, a server performs clock error prediction and orbit prediction based on a data source to obtain a predicted orbit and a predicted clock error. A terminal device obtains the predicted orbit and the predicted clock error from the server in a network request manner, and then performs positioning based on the predicted orbit and the predicted clock error.

In the conventional technology, because precise ephemeris clock error data has higher precision than broadcast ephemeris clock error data, the precise ephemeris clock error data is usually used to generate a predicted clock error with higher precision. However, a precise clock error has a time-varying reference deviation, reference deviations of precise ephemeris clock error data from different sources are different, and the reference deviation affects precision and reliability of clock error prediction.

SUMMARY

Embodiments of this application provide a clock error prediction method and apparatus, which can effectively improve precision and reliability of clock error prediction.

According to a first aspect, an embodiment of this application provides a clock error prediction method, applied to a server. The method includes: obtaining historical satellite clock error data of a preset time period, where the historical satellite clock error data includes broadcast ephemeris clock error data and precise ephemeris clock error data; correcting a reference deviation of the precise ephemeris clock error data based on the broadcast ephemeris clock error data to obtain corrected precise ephemeris clock error data; obtaining a single-day clock speed of each satellite through fitting based on single-day clock error data in the corrected precise ephemeris clock error data of each satellite; obtaining a clock speed time sequence of each satellite based on the single-day clock speed of each satellite; obtaining a clock speed change rate of each satellite through fitting based on the clock speed time sequence of each satellite; and obtaining a predicted clock error of each satellite in a preset future time period based on an initial clock error value, a clock speed, and the clock speed change rate of each satellite.

Based on the foregoing technical solution, the server first corrects the reference deviation of the precise ephemeris clock error data based on the broadcast ephemeris clock error data, and then performs clock error prediction by using the corrected precise ephemeris clock error data, to avoid impact of a reference deviation of precise clock error data on clock error prediction, which improves precision and reliability of clock error prediction.

In some possible implementations of the first aspect, a process of correcting a reference deviation of the precise ephemeris clock error data based on the broadcast ephemeris clock error data to obtain corrected precise ephemeris clock error data may include:

calculating a difference between a broadcast ephemeris clock error sequence and a precise ephemeris clock error sequence of a same epoch to obtain a difference sequence of each epoch, where the broadcast ephemeris clock error data includes broadcast ephemeris clock error sequences of epochs, and the precise ephemeris clock error data includes precise ephemeris clock error sequences of the epochs;

determining an average value and a standard deviation of each difference sequence;

for each difference sequence, removing, from the difference sequence based on the average value and the standard deviation, a difference point that does not meet a preset condition, to obtain a target difference sequence;

calculating a reference deviation based on the target difference sequence; and calculating a difference between the precise ephemeris clock error data and the reference deviation to obtain the corrected precise ephemeris clock error data.

In this implementation, the precise ephemeris clock error data is corrected based on the broadcast ephemeris clock error data, to improve precision of the precise ephemeris clock error data, which improves precision and reliability of subsequent clock error prediction.

In some possible implementations of the first aspect, a process of calculating a reference deviation based on the target difference sequence may include:

calculating the reference deviation by using $$b(t) = \frac{1}{N} \sum_{i=1}^{i=N} dclk_i,$$

where
N is a quantity of clock error difference points included in the target difference sequence, b(t) is the reference deviation, and $dclk_i$ is an $i^{th}$ clock error difference point in the target difference sequence.

In some possible implementations of the first aspect, a process of removing, from the difference sequence based on the average value and the standard deviation, a difference point that does not meet a preset condition, to obtain a target difference sequence includes:

determining, based on the average value and the standard deviation, whether each difference point in the difference sequence satisfies $$\left| \frac{x - \mu}{\delta} \right| > 3,$$

where x is the difference point in the difference sequence, μ is the average value of the difference sequence, and δ is the standard deviation of the difference sequence;

if the difference point satisfies the formula, determining that the difference point does not meet the preset condition, and removing the difference point that does not meet the preset condition, to obtain a difference sequence after elimination of the difference point: and after an average value and a standard deviation of the difference sequence after elimination of the difference point are determined, using the difference sequence after elimination of the difference point as the difference sequence, returning to the step of determining, based on the average value and the standard deviation, whether each difference point in the difference sequence satisfies $$\left|\frac{x-\mu}{\delta}\right| > 3,$$

until no difference point in the difference sequence meets the preset condition, and using the difference sequence with no difference point meeting the preset condition as the target difference sequence.

In some possible implementations of the first aspect, the obtaining a single-day clock speed of each satellite through fitting based on single-day clock error data in the corrected precise ephemeris clock error data of each satellite includes:

performing, for each satellite, coarse difference detection on the single-day clock error data in the corrected precise ephemeris clock error data, to obtain single-day clock error data after the coarse difference detection; and obtaining the single-day clock speed of each satellite through fitting based on the single-day clock error data after the coarse difference detection.

In some possible implementations of the first aspect, a process of obtaining a clock speed change rate of each satellite through fitting based on the clock speed time sequence of each satellite may include:

for each satellite, fitting the clock speed time sequence by using a sliding window;

in a sliding process of the sliding window, each time a quantity of clock speeds in the sliding window is greater than or equal to a preset quantity, predicting a predicted clock speed at a next moment based on a clock speed in the sliding window at a current moment and a fitting result obtained through previous fitting;

when a difference between the predicted clock speed at the next moment and a clock speed to be added to the sliding window is less than or equal to a first preset threshold, after the clock speed to be added to the sliding window is added to the sliding window, obtaining a current clock speed change rate through fitting based on the clock speed in the sliding window, and obtaining a fitting residual;

if the fitting residual is less than or equal to a second preset threshold, using the current clock speed change rate as the clock speed change rate;

if the fitting residual is greater than the second preset threshold, resetting the sliding window and making the sliding window continue to slide forward until the clock speed time sequence is traversed or the fitting residual is less than or equal to the second preset threshold; and when the difference between the clock speed at the next moment and the clock speed to be added to the sliding window is greater than the first preset threshold, resetting the sliding window and making the sliding window continue to slide forward until the clock speed time sequence is traversed or the fitting residual is less than or equal to the second preset threshold.

In this implementation, in a process of fitting the clock speed time sequence by using the sliding window, a value of the fitting residual is compared with the second preset threshold, and a value of a clock speed of a to-be-added window is compared with a value of a clock speed at a next moment of fitting prediction, to detect and remove an exception in a fitting process, which further improves accuracy of the clock speed change rate, to further improve precision and reliability of clock error prediction.

According to a second aspect, an embodiment of this application provides a clock error prediction apparatus, used in a server. The apparatus may include:

an obtaining module, configured to obtain historical satellite clock error data of a preset time period, where the historical satellite clock error data includes broadcast ephemeris clock error data and precise ephemeris clock error data;

a reference deviation correction module, configured to correct a reference deviation of the precise ephemeris clock error data based on the broadcast ephemeris clock error data to obtain corrected precise ephemeris clock error data;

a single-day clock speed fitting module, configured to obtain a single-day clock speed of each satellite through fitting based on single-day clock error data in the corrected precise ephemeris clock error data of each satellite;

a clock speed time sequence determining module, configured to obtain a clock speed time sequence of each satellite based on the single-day clock speed of each satellite;

a clock speed change rate fitting module, configured to obtain a clock speed change rate of each satellite through fitting based on the clock speed time sequence of each satellite; and a clock error prediction module, configured to obtain a predicted clock error of each satellite in a preset future time period based on an initial clock error value, a clock speed, and the clock speed change rate of each satellite.

In some possible implementations of the second aspect, the reference deviation correction module is specifically configured to:

calculate a difference between a broadcast ephemeris clock error sequence and a precise ephemeris clock error sequence of a same epoch to obtain a difference sequence of each epoch, where the broadcast ephemeris clock error data includes broadcast ephemeris clock error sequences of epochs, and the precise ephemeris clock error data includes precise ephemeris clock error sequences of the epochs;

determine an average value and a standard deviation of each difference sequence;

for each difference sequence, remove, from the difference sequence based on the average value and the standard deviation, a difference point that does not meet a preset condition, to obtain a target difference sequence;

calculate a reference deviation based on the target difference sequence; and calculate a difference between the precise ephemeris clock error data and the reference deviation to obtain the corrected precise ephemeris clock error data.

In some possible implementations of the second aspect, the reference deviation correction module is specifically configured to:

calculate the reference deviation by using $$b(t) = \frac{1}{N} \sum_{i=1}^{i=N} dclk_i,$$

where

N is a quantity of clock error difference points included in the target difference sequence, b(t) is the reference deviation, and $dclk_i$ is an $i^{th}$ clock error difference point in the target difference sequence.

In some possible implementations of the second aspect, the reference deviation correction module is specifically configured to:

determine, based on the average value and the standard deviation, whether each difference point in the difference sequence satisfies $$\left| \frac{x - \mu}{\delta} \right| > 3,$$

where x is the difference point in the difference sequence, μ is the average value of the difference sequence, and δ is the standard deviation of the difference sequence;

if the difference point satisfies the formula, determine that the difference point does not meet the preset condition, and remove the difference point that does not meet the preset condition, to obtain a difference sequence after elimination of the difference point; and after an average value and a standard deviation of the difference sequence after elimination of the difference point are determined, use the difference sequence after elimination of the difference point as the difference sequence, return to the step of determining, based on the average value and the standard deviation, whether each difference point in the difference sequence satisfies $$\left| \frac{x - \mu}{\delta} \right| > 3,$$

until no difference point in the difference sequence meets the preset condition, and use the difference sequence with no difference point meeting the preset condition as the target difference sequence.

In some possible implementations of the second aspect, the single-day clock speed fitting module is specifically configured to:

perform, for each satellite, coarse difference detection on the single-day clock error data in the corrected precise ephemeris clock error data, to obtain single-day clock error data after the coarse difference detection; and obtain the single-day clock speed of each satellite through fitting based on the single-day clock error data after the coarse difference detection.

In some possible implementations of the second aspect, the clock speed change rate fitting module is specifically configured to:

for each satellite, fit the clock speed time sequence by using a sliding window;

in a sliding process of the sliding window, each time a quantity of clock speeds in the sliding window is greater than or equal to a preset quantity, predict a predicted clock speed at a next moment based on a clock speed in the sliding window at a current moment and a fitting result obtained through previous fitting;

when a difference between the predicted clock speed at the next moment and a clock speed to be added to the sliding window is less than or equal to a first preset threshold, after the clock speed to be added to the sliding window is added to the sliding window, obtain a current clock speed change rate through fitting based on the clock speed in the sliding window, and obtain a fitting residual;

if the fitting residual is less than or equal to a second preset threshold, use the current clock speed change rate as the clock speed change rate;

if the fitting residual is greater than the second preset threshold, reset the sliding window and make the sliding window continue to slide forward until the clock speed time sequence is traversed or the fitting residual is less than or equal to the second preset threshold; and when the difference between the clock speed at the next moment and the clock speed to be added to the sliding window is greater than the first preset threshold, reset the sliding window and make the sliding window continue to slide forward until the clock speed time sequence is traversed or the fitting residual is less than or equal to the second preset threshold.

According to a third aspect, an embodiment of this application provides a server, including a memory, a processor, and a computer program that is stored in the memory and that can be run on the processor. When executing the computer program, the processor implements the method according to any implementation of the first aspect.

According to a fourth aspect, an embodiment of this application provides a computer-readable storage medium. The computer-readable storage medium stores a computer program. When the computer program is executed by a processor, the method according to any implementation of the first aspect is implemented.

According to a fifth aspect, an embodiment of this application provides a chip system. The chip system includes a processor, the processor is coupled to a memory, and the processor executes a computer program stored in the memory, to implement the method according to any implementation of the first aspect. The chip system may be a single chip or a chip module including a plurality of chips.

According to a sixth aspect, an embodiment of this application provides a computer program product. When the computer program product runs on an electronic device, the electronic device is enabled to perform the method according to any implementation of the first aspect.

It may be understood that, for beneficial effects of the second aspect to the sixth aspect, refer to related descriptions in the first aspect. Details are not described herein again.

BRIEF DESCRIPTION OF DRAWINGS

FIG. 6 is a schematic block diagram of a correction process of a reference deviation of precise ephemeris clock error data according to an embodiment of this application;

FIG. 8 is a schematic flowchart of an ephemeris prediction method according to an embodiment of this application;

FIG. 9 is a schematic block diagram of a satellite orbit prediction procedure according to an embodiment of this application;

DESCRIPTION OF EMBODIMENTS

With wide application of terminal devices such as mobile phones, intelligent wearable devices, tablet computers, and in-vehicle infotainment, location-based services (Location-Based Services, LBS) also attract more and more attention. During use of an LBS, a terminal device needs to perform positioning first to determine a current position.

The terminal device generally performs positioning based on a global navigation satellite system (Global Navigation Satellite System, GNSS). Specifically, when initiating a positioning request, the terminal device demodulates a complete set of ephemeris from a satellite navigation signal by using a built-in GNSS chip, and then completes positioning based on the complete ephemeris.

Currently, when the terminal device performs positioning based on the GNSS, if a time to first fix (Time To First Fix, TTFF) is excessively long, user experience may be affected. To reduce the TTFF and improve user experience, an assisted GNSS (Assisted GNSS, AGNSS) technology is proposed. The AGNSS technology can be divided into a standard AGNSS service and an extended ephemeris (Extended Ephemeris) service. A standard AGNSS and a predicted GNSS (Predicted GNSS, PGNSS) are separately described below by using examples.

Figure 1:
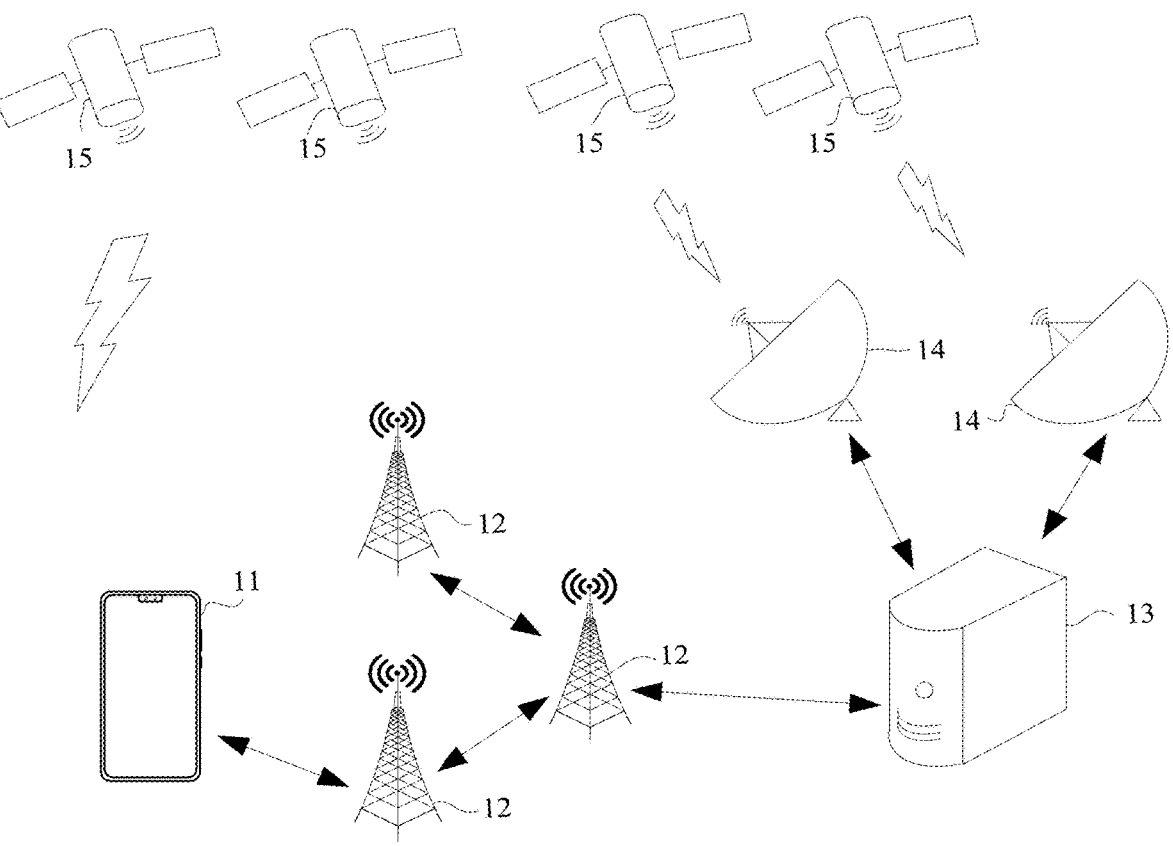
FIG. 1 is a schematic diagram of an architecture of a standard AGNSS system according to an embodiment of this application.

(1) Standard AGNSS. FIG. 1 is a schematic diagram of an architecture of a standard AGNSS system according to an embodiment of this application. As shown in FIG. 1, the system may include a terminal device 11, data exchange centers 12, an AGNSS server 13, GNSS observation stations 14, and GNSS satellites 15.

The GNSS observation stations 14 are configured to: obtain GNSS signals of the GNSS satellites 15, demodulate broadcast ephemeris parameters from the GNSS signals in real time, and send the demodulated broadcast ephemeris parameters to the AGNSS server 13.

The AGNSS server 13 is configured to: receive the broadcast ephemeris parameters sent by the GNSS observation stations 14, and store the broadcast ephemeris parameters. In addition, the AGNSS server 13 is further configured to: after receiving a positioning request of the terminal device 11, send the broadcast ephemeris parameters to the terminal device 11 in response to the positioning request.

The terminal device 11 is configured to: initiate a positioning request, and send the positioning request to the AGNSS service 13 through the data exchange centers 12. In addition, the terminal device 11 is further configured to: receive the broadcast ephemeris parameters returned by the AGNSS server 13, and perform positioning based on the broadcast ephemeris parameters.

For example, a terminal positioning process based on a standard GNSS system includes:

In each positioning process, the terminal device 11 sends a positioning request to the AGNSS server 13 through a network, where the positioning request is used for obtaining broadcast ephemeris parameters. After receiving the positioning request of the terminal device 11, the AGNSS server 13 sends, through the network, broadcast ephemeris parameters corresponding to the positioning request to the terminal device 11.

The terminal device 11 receives, through the network, the broadcast ephemeris parameters returned by the AGNSS server 13, calculates positions and speeds of all visible GNSS satellites by using a built-in GNSS chip based on the broadcast ephemeris parameters, and then determines a current position and/or a current speed based on the positions and speeds of the GNSS satellites and GNSS observation data. In other words, the terminal device may determine, based on the GNSS, the current position, the current speed, or the current position and the current speed.

Figure 2:
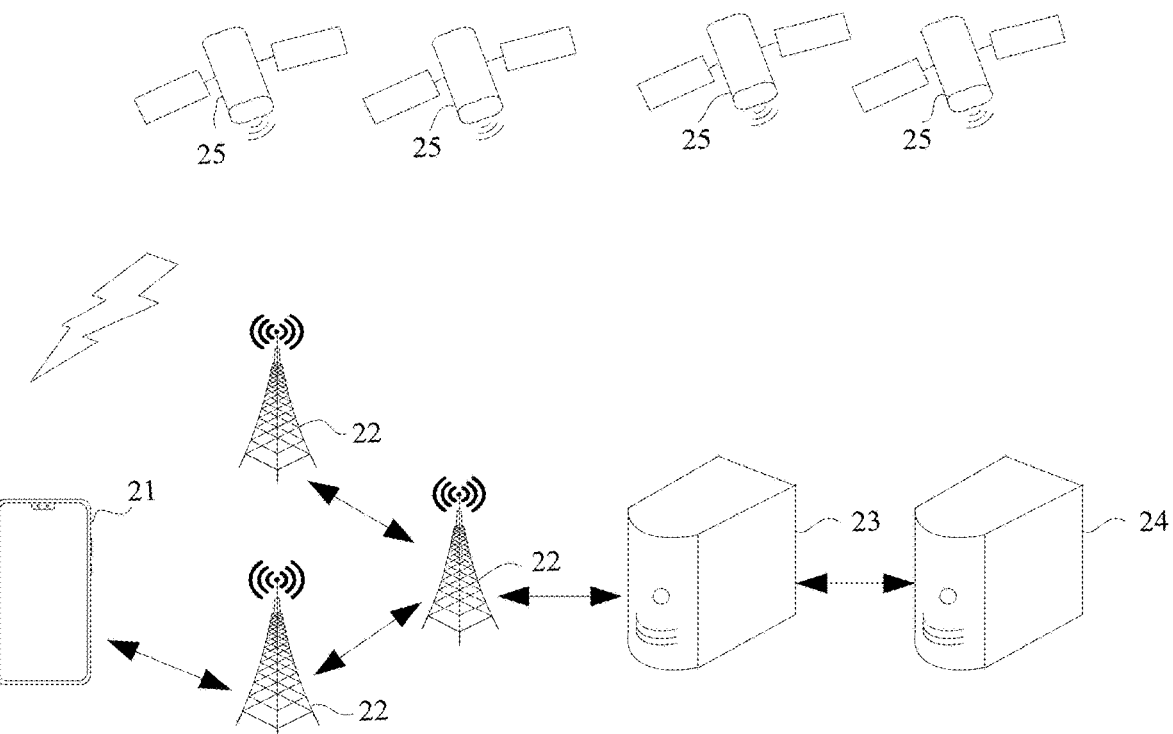
FIG. 2 is a schematic block diagram of an architecture of a PGNSS system according to an embodiment of this application.

(2) PGNSS. FIG. 2 is a schematic block diagram of an architecture of a PGNSS system according to an embodiment of this application. As shown in FIG. 2, the system may include a terminal device 21, data exchange centers 22, a PGNSS server 23, a data source server 24, and GNSS satellites 25.

The data exchange centers 22 are configured to transmit data. The data source server 24 is configured to store a data source, where the data source may be, but is not limited to, precise ephemeris data, broadcast ephemeris data, or an original carrier phase observation quantity. The PGNSS server 23 is configured to: obtain the data source stored in the data source server 24, and generate predicted ephemeris data based on the data source.

The terminal device 21 is configured to: obtain the predicted ephemeris data generated by the PGNSS server 23, and determine a current position and/or a current speed of the terminal device 21 based on the predicted ephemeris data.

For example, a terminal positioning process based on the PGNSS system includes:

After obtaining the data source, the PGNSS server 23 performs modeling based on the data source to obtain a satellite orbit prediction model and a satellite clock error prediction model; then performs satellite orbit prediction based on the satellite orbit prediction model to obtain a predicted orbit; performs satellite clock error prediction based on the satellite clock error prediction model to obtain a predicted clock error; and then fits the predicted orbit and the predicted clock error into broadcast ephemeris parameters and transmits the broadcast ephemeris parameters to the terminal device 21.

After obtaining the broadcast ephemeris parameters, the terminal device 21 may periodically inject the broadcast ephemeris parameters into a GNSS chip, to calculate positions, speeds, and clock errors of visible GNSS satellites by using the GNSS chip and the broadcast ephemeris parameters, and determine the current position and/or the current speed based on the positions, the speeds, and the clock errors of the visible GNSS satellites, a pseudorange, a carrier phase observation quantity, and the like.

The technical solutions provided in embodiments of this application are described below in detail. In the following description, specific details such as particular system structures, techniques, and the like are presented for the purpose of description rather than limitation, in order to provide a thorough understanding of embodiments of this application.

Figure 3:
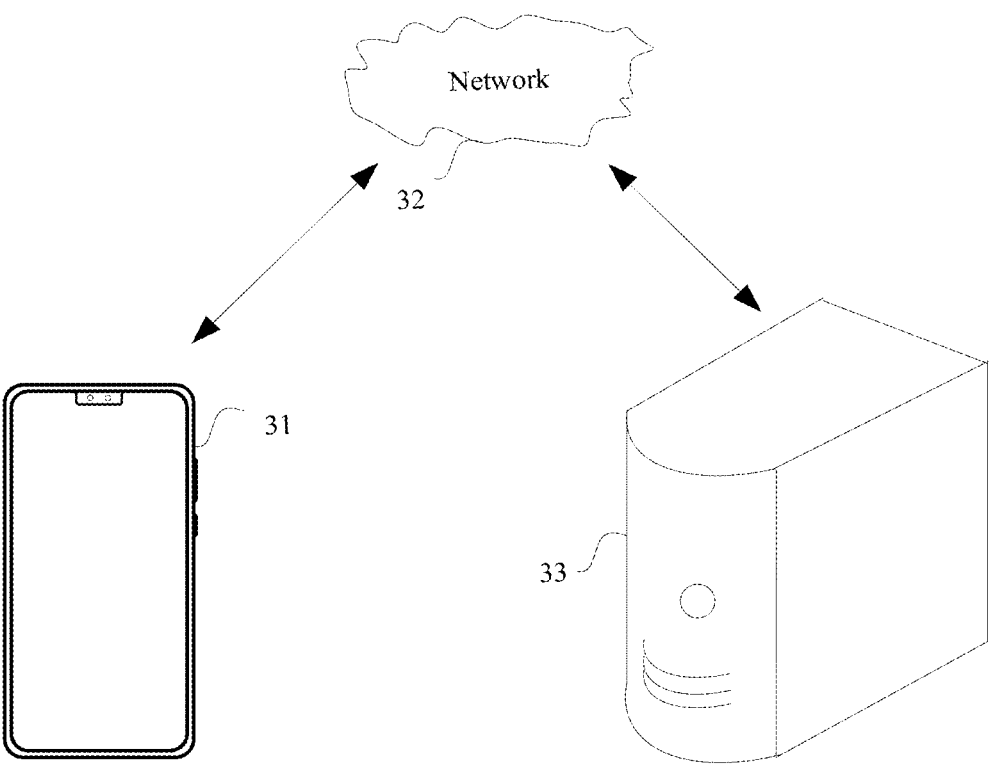
FIG. 3 is a schematic block diagram of a system architecture of an ephemeris prediction solution according to an embodiment of this application.

FIG. 3 is a schematic block diagram of a system architecture of an ephemeris prediction solution according to an embodiment of this application. As shown in FIG. 3, the system may include a terminal device 31 and a server 33. The terminal device 31 and the server 33 are connected by a network 32.

The terminal device 31 is a device that has a wireless transceiver function, and may be a handheld terminal device, a vehicle, a vehicle-mounted terminal, an intelligent wearable device, another computing device, or the like. For example, the terminal device is a portable terminal device, for example, a mobile phone or a tablet computer, or may be an augmented reality (augmented reality, AR) device, a virtual reality (virtual reality, VR) device, or an ultra-mobile personal computer (ultra-mobile personal computer, UMPC). A specific type of the terminal device 31 is not limited in embodiments of this application. FIG. 3 shows an example in which the terminal device 31 is a mobile phone.

Figure 4:
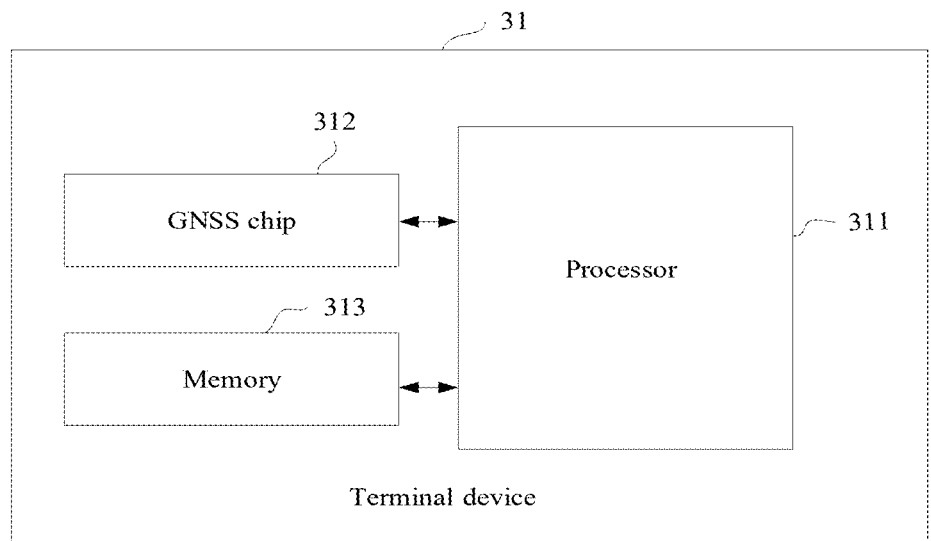
FIG. 4 is a schematic structural block diagram of a terminal device 31 according to an embodiment of this application.

A specific structure of the terminal device 31 may vary with a type of the terminal device 31. FIG. 4 is a schematic structural block diagram of a terminal device 31 according to an embodiment of this application. The terminal device 31 may include, but is limited to, a processor 311, a GNSS chip 312, and a memory 313. Both the GNSS chip 312 and the memory 313 are communicatively connected to the processor 311. Certainly, the terminal device 31 further includes a GNSS antenna configured to send and receive a GNSS signal.

The processor 311 may include one or more processing units. For example, the processor 311 may include an application processor (application processor, AP), a modem processor, a controller, a baseband processor, and the like. Different processing units may be independent components, or may be integrated into one or more processors.

The controller may be a nerve center and a command center of the terminal device 31. The controller may generate an operation control signal based on an instruction operation code and a time sequence signal, to complete control of instruction fetching and instruction execution.

The memory 313 may be configured to store computer-executable program code, and the executable program code includes instructions. The processor 311 executes various function applications and data processing of the terminal device 31 by running the instructions stored in the memory 313. The memory 313 may include a program storage area and a data storage area. The program storage area may store an operating system, an application required by at least one function, and the like. The data storage area may store data or the like created during use of the terminal device 31. For example, after receiving broadcast ephemeris parameters from a server end, the terminal device 31 stores the broadcast ephemeris parameters in the data storage area, periodically reads the broadcast ephemeris parameters from the data storage area, and injects the broadcast ephemeris parameters into the GNSS chip 312.

In addition, the memory 313 may include a high-speed random access memory, and may further include a non-volatile memory, for example, at least one magnetic disk storage device, a flash memory device, or a universal flash storage (universal flash storage, UFS).

The terminal device 31 may send and receive a GNSS signal and implement GNSS positioning and/or speed setting through the GNSS antenna and the GNSS chip 312.

In embodiments of this application, the GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

It can be understood that the structure illustrated in embodiments of this application does not impose a specific limitation on the terminal device 31. In some other embodiments of this application, the terminal device 31 may include more or fewer components than those shown in the figure, or some components can be combined, or some components can be split, or a different component arrangement can be used. The components shown in the figure may be implemented by hardware, software, or a combination of software and hardware.

For example, when the terminal device 31 is an intelligent wearable device, the intelligent wearable device may be a smart band, a smart watch, smart glasses, or the like. In this case, the terminal device 31 may further include a sensor, a display screen, and the like. The sensor may include a photoelectric sensor and a physiological sensor.

For example, when the terminal device 31 is a mobile phone, the terminal device 31 may further include a charging management module, a power management module, a battery, a mobile communication module, an audio module, a speaker, a receiver, a microphone, a headset interface, a sensor module, a button, a motor, an indicator, a camera, a display screen, a subscriber identification module (subscriber identification module, SIM) card interface, and the like.

The server 32 may include one or more servers. Generally, the server 32 mainly includes a PGNSS server.

In a specific application, the server 32 is configured to: obtain a data source, perform satellite orbit prediction and satellite clock error prediction based on the data source, convert a predicted orbit and a predicted clock error into specific parameters, and transmit the parameters to the terminal device 31.

The terminal device 31 is configured to: obtain the predicted orbit and the predicted clock error from the server 32 in a network request manner, calculate positions, speeds, and the like of visible GNSS satellites by using the GNSS chip based on the predicted orbit and the predicted clock error, and then determine a current position and/or a current speed of the terminal device based on the positions, the speeds, and the like of the GNSS satellites.

Embodiments of this application may be applicable to a navigation positioning anchor speed testing scenario. For example, the terminal device 31 is a vehicle-mounted terminal, and the vehicle-mounted terminal performs vehicle positioning and vehicle speed measurement by using the GNSS. In another example, the terminal device 31 is a mobile phone, and an application program of the mobile phone recommends a commodity to a user by using an LBS. Application scenarios are not limited in embodiments of this application.

After a system structure and an application scenario that may be used in embodiments of this application are described, the technical solutions in embodiments of this application are described below in detail with reference to the accompanying drawings.

Figure 5:
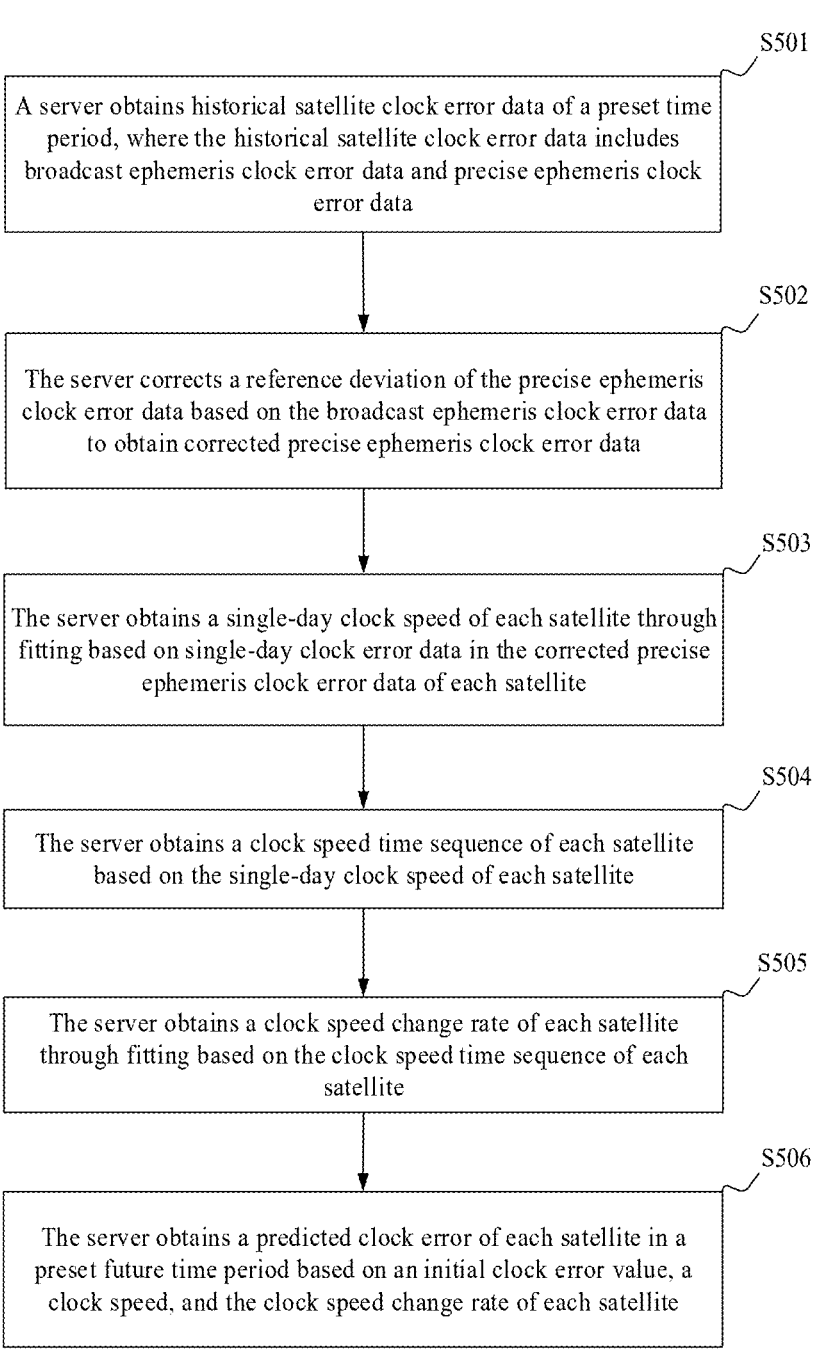
FIG. 5 is a schematic block diagram of a procedure of a clock error prediction method according to an embodiment of this application.

FIG. 5 is a schematic block diagram of a procedure of a clock error prediction method according to an embodiment of this application. The method is applied to a server, and the procedure may include the following steps.

Step S501: The server obtains historical satellite clock error data of a preset time period, where the historical satellite clock error data includes broadcast ephemeris clock error data and precise ephemeris clock error data.

It should be noted that the preset time period may be set according to an actual requirement. For example, the preset time period is two days, to be specific, the server obtains historical satellite clock error data of two days.

It should be noted that a clock error of an atomic clock carried on a GNSS satellite is usually described by using a linear polynomial or a quadratic polynomial. For example, a broadcast ephemeris clock error may be shown in the following Formula (1).

$$
\begin{cases}
clk^1(t) = a_0^1 + a_1^1(t-t_0) + \dfrac{1}{2}a_2^1(t-t_0)^2 + \varepsilon^1(t) \\
\quad\vdots \\
clk^n(t) = a_0^n + a_1^n(t-t_0) + \dfrac{1}{2}a_2^n(t-t_0)^2 + \varepsilon^n(t)
\end{cases}
\tag{1}
$$

$clk^n(t)$ is a satellite clock error at a moment t.

$$a_0^n$$

is a clock error at an initial moment $t_0$, $$a_1^n$$

is a clock speed at the initial moment $t_0$, and $$a_2^n$$

is a clock drift at the initial moment $t_0$. $\varepsilon(t)$ is an uncertainty component that changes randomly.

The precise ephemeris clock error data may be shown in the following Formula (2).

$$
\begin{cases}
clk^1(t) = a_0^1 + a_1^1(t-t_0) + \dfrac{1}{2}a_2^1(t-t_0)^2 + \varepsilon^1(t) + b(t) \\
\quad\vdots \\
clk^n(t) = a_0^n + a_1^n(t-t_0) + \dfrac{1}{2}a_2^n(t-t_0)^2 + \varepsilon^n(t) + b(t)
\end{cases}
\tag{2}
$$

$b(t)$ is a reference deviation.

In comparison, the precise ephemeris clock error data has higher precision than broadcast ephemeris clock error data, and a predicted clock error with higher precision may be generated based on the precise ephemeris clock error data. However, compared with the broadcast ephemeris clock error, a precise clock error has a time-varying reference deviation b(t). In addition, reference deviations b(t) of precise ephemeris clock error data from different sources are different.

The reference deviation b(t) affects precision of clock error prediction. To further improve precision of satellite clock error prediction, the precise ephemeris clock error data may be corrected before the precise ephemeris clock error data is used for satellite clock error prediction, and then the corrected precise ephemeris clock error data is used for satellite clock error prediction.

Step S502: The server corrects a reference deviation of the precise ephemeris clock error data based on the broadcast ephemeris clock error data to obtain corrected precise ephemeris clock error data.

In some embodiments, FIG. 6 is a schematic block diagram of a correction process of a reference deviation of precise ephemeris clock error data. The correction process may include the following steps.

Step S601: The server calculates a difference between a broadcast ephemeris clock error sequence and a precise ephemeris clock error sequence of a same epoch to obtain a difference sequence of each epoch, where the broadcast ephemeris clock error data includes broadcast ephemeris clock error sequences of epochs, and the precise ephemeris clock error data includes precise ephemeris clock error sequences of the epochs.

For example, GPS broadcast ephemeris clock errors and precise clock errors of an epoch correspond to 32 clock error sequences (that is, 32 satellites) respectively. The broadcast ephemeris clock error sequence is $$clk_B^i, i = 1, 2, \ldots, 32.$$

The precise ephemeris clock error sequence is $$clk_C^i, i = 1, 2, \ldots, 32.$$

In this case, a difference between the broadcast ephemeris clock error sequence and the precise ephemeris clock error sequence of the epoch is calculated, to obtain the difference sequence of the epoch:

$$dclk_i - clk_G^i - clk_B^i, i = 1, 2, \ldots, 32.$$

It may be understood that each epoch corresponds to one difference sequence.

Step S602: The server determines an average value and a standard deviation of each difference sequence.

Specifically, after the difference sequence of each epoch is obtained, for each difference sequence, an average value and a standard deviation of the difference sequence are calculated.

For example, a difference sequence of an epoch is $$dclk_1 = clk_G^i - clk_B^i, i = 1, 2,$$

32, an average value is $$\mu = \frac{1}{32} \sum_{i=1}^{32} dclk_i,$$

and a standard deviation is $$\delta = \sqrt{\frac{1}{32} \sum_{i=1}^{32} (dclk_i - \mu)^2}.$$

Step S603: For each difference sequence, the server removes, from the difference sequence based on the average value and the standard deviation, a difference point that does not meet a preset condition, to obtain a target difference sequence.

In some embodiments, an abnormal difference in the difference sequence may be eliminated in an iterative manner by using 3sigma. Specifically, for each difference sequence, it is determined, based on the average value and the standard deviation, whether each difference point in the difference sequence satisfies $$\left| \frac{x - \mu}{\delta} \right| > 3,$$

where x is the difference point in the difference sequence, μ is the average value of the difference sequence, and is the standard deviation of the difference sequence.

It may be understood that, there are a plurality of difference points in the difference sequence, and it is determined, based on the standard deviation and the average value of the difference sequence, whether each difference point in the difference sequence satisfies $$\left| \frac{x - \mu}{\delta} \right| > 3.$$

If a difference point satisfies $$\left| \frac{x - \mu}{\delta} \right| > 3,$$

it is determined that the difference point does not meet the preset condition, and the difference point is considered as an abnormal difference point, and the difference point is removed. In this way, each difference point is determined, to obtain a difference sequence after elimination of the difference point.

After the first round of abnormal difference elimination process is completed, a next round of abnormal difference elimination process is performed based on the difference sequence after elimination of the difference point.

In a next round of abnormal difference elimination process, the server calculates an average value and a standard deviation of the difference sequence after elimination of the difference point, and determines, based on the average value and the standard deviation, whether each difference point in the difference sequence after elimination of the difference point satisfies $$\left| \frac{x - \mu}{\delta} \right| > 3,$$

and if the difference point satisfies the formula, eliminates the corresponding difference point. In this way, each difference point is determined, to obtain a difference sequence again after the difference point is eliminated.

The foregoing abnormal difference elimination process is performed iteratively until no difference point is eliminated from a difference sequence, and the difference sequence is the target difference sequence.

In the iteration process, after the first round of abnormal difference elimination process is performed, it may be considered that the difference sequence after elimination of the difference point is used as the difference sequence, the process returns to the step of determining, based on the average value and the standard deviation, whether each difference point in the difference sequence satisfies $$\left| \frac{x - \mu}{\delta} \right| > 3,$$

until no difference point in the difference sequence satisfies the preset condition, and the difference sequence with no difference point meeting the preset condition is used as the target difference sequence.

For example, a difference sequence is $$dclk_i = clk_G^i - clk_B^i, i = 1, 2, \ldots, 32,$$

and there are a total of 32 difference points in the difference sequence.

First, an average value and a standard deviation of the difference sequence are calculated, and it is determined whether each of the 32 difference points satisfies $$\left| \frac{x - \mu}{\delta} \right| > 3.$$

In this case, it is assumed that two difference points satisfy $$\left| \frac{x - \mu}{\delta} \right| > 3,$$

and the two difference points are considered as abnormal difference points. The two abnormal difference points are eliminated to obtain a difference sequence after elimination of the difference points. The difference sequence after elimination of the difference points herein includes 30 difference points. At this point, the first round of abnormal difference point elimination process is completed.

Then, a next round of abnormal difference point elimination process is performed. In this case, an average value and a standard deviation of the difference sequence including 30 difference points are calculated, and it is determined, based on the average value and the standard deviation, whether each of the 30 difference points satisfies $$\left| \frac{x - \mu}{\delta} \right| > 3.$$

In this case, assuming that one difference point satisfies $$\left|\frac{x-\mu}{\delta}\right| > 3,$$

it is considered that the one difference point is an abnormal difference point, and the abnormal difference point is eliminated, to obtain a difference sequence after elimination of the difference point. The difference sequence after elimination of the difference point herein includes 29 difference points.

Next, a next round of abnormal difference point elimination process is then performed. In this case, an average value and a standard deviation of the difference sequence including 29 difference points are calculated, and it is determined, based on the average value and the standard deviation, whether each of the 29 difference points satisfies $$\left|\frac{x-\mu}{\delta}\right| > 3.$$

In this case, assuming that one difference point satisfies $$\left|\frac{x-\mu}{\delta}\right| > 3,$$

it is considered that the one difference point is an abnormal difference point, and the abnormal difference point is eliminated, to obtain a difference sequence after elimination of the difference point. The difference sequence after elimination of the difference point herein includes 28 difference points.

Next, a next round of abnormal difference point elimination process is then performed. In this case, an average value and a standard deviation of the difference sequence including 28 difference points are calculated, and it is determined, based on the average value and the standard deviation, whether each of the 28 difference points satisfies $$\left|\frac{x-\mu}{\delta}\right| > 3.$$

In this case, it is assumed that no difference point satisfies $$\left|\frac{x-\mu}{\delta}\right| > 3,$$

in other words, there is no difference point to be eliminated, and the difference sequence including 28 difference points is used as the target difference sequence.

It should be noted that, during actual application, only one round of abnormal difference point elimination process may be performed.

Step S604: The server calculates a reference deviation based on the target difference sequence.

For example, the reference deviation is calculated by using the following Formula (3).

$$b(t) = \frac{1}{N}\sum_{i=1}^{i=N} dclk_i \tag{3}$$

N represents a quantity of clock error differences included in the target difference sequence. For example, after a plurality of rounds of abnormal difference point elimination, the target sequence still has 28 difference points, in other words, the target sequence includes 28 difference points. In this case, N=28.

Step S605: The server calculates a difference between the precise ephemeris clock error data and the reference deviation to obtain the corrected precise ephemeris clock error data.

Specifically, the server may subtract the reference deviation from the precise ephemeris clock error data in satellite clock error data to obtain the corrected precise ephemeris clock error data.

It should be noted that the precise ephemeris clock error data is corrected based on the broadcast ephemeris clock error data, which can further improve the precision and reliability of satellite clock error prediction.

Step S503: The server obtains a single-day clock speed of each satellite through fitting based on single-day clock error data in the corrected precise ephemeris clock error data of each satellite.

It may be understood that the corrected precise ephemeris clock error data includes clock error data of one or more days of each satellite, and single-day fitting is performed on each satellite based on the single-day clock error data of each satellite, to obtain the single-day clock speed.

In some embodiments, the server may first perform coarse difference detection on the single-day clock error data in the corrected precise ephemeris clock error data, to obtain the precise ephemeris clock error data obtained through the coarse difference detection.

During the coarse difference detection, if an item $a_0$ or an item $a_1$ in an original clock error time sequence jumps, the original clock error time sequence is segmented, and a coarse difference is eliminated to obtain satellite clock error data after coarse difference detection. The original clock error time sequence herein refers to the corrected precise ephemeris clock error data. The item $a_0$ refers to a clock error, and the item $a_0$ refers to a clock speed.

In embodiments of this application, the coarse difference detection method may be any method. For example, the coarse difference detection method may be median detection.

It should be noted that, in some other embodiments, the server may not perform coarse difference detection on clock error data. However, in contrast, the coarse difference detection may eliminate a coarse difference from the clock error data, so that precision of subsequent clock error prediction is higher.

After the coarse difference detection, the server uses the precise ephemeris clock error data obtained through coarse difference detection as an observation value, and establishes a linear polynomial model or a quadratic polynomial model for each satellite. For example, an observation equation of a satellite is shown in the following Formula (4).

$$\begin{pmatrix} t_0 & t_1 \\ \vdots & \vdots \\ t_{k-1} & t_k \end{pmatrix}\begin{pmatrix} a_0 \\ a_1 \end{pmatrix} = \begin{pmatrix} clk_0 \\ \vdots \\ clk_k \end{pmatrix} \tag{4}$$

$a_0$ indicates the clock error, and a indicates the clock speed.

Based on the single-day clock error data of each satellite, the server performs single-day fitting on clock errors by using a least square method, to calculate a clock error model coefficient of each satellite every day. For example, the foregoing Formula (4) is used as an example. Single-day fitting is performed on clock errors, to obtain clock error model coefficients $a_0$ and $a_1$ of each satellite every day.

It may be understood that, if coarse difference detection is not performed, the corrected precise ephemeris clock error data is directly used as an observation value, and the single-day clock speed of each satellite is obtained through fitting.

Step S504: The server obtains a clock speed time sequence of each satellite based on the single-day clock speed of each satellite.

Figure 7:
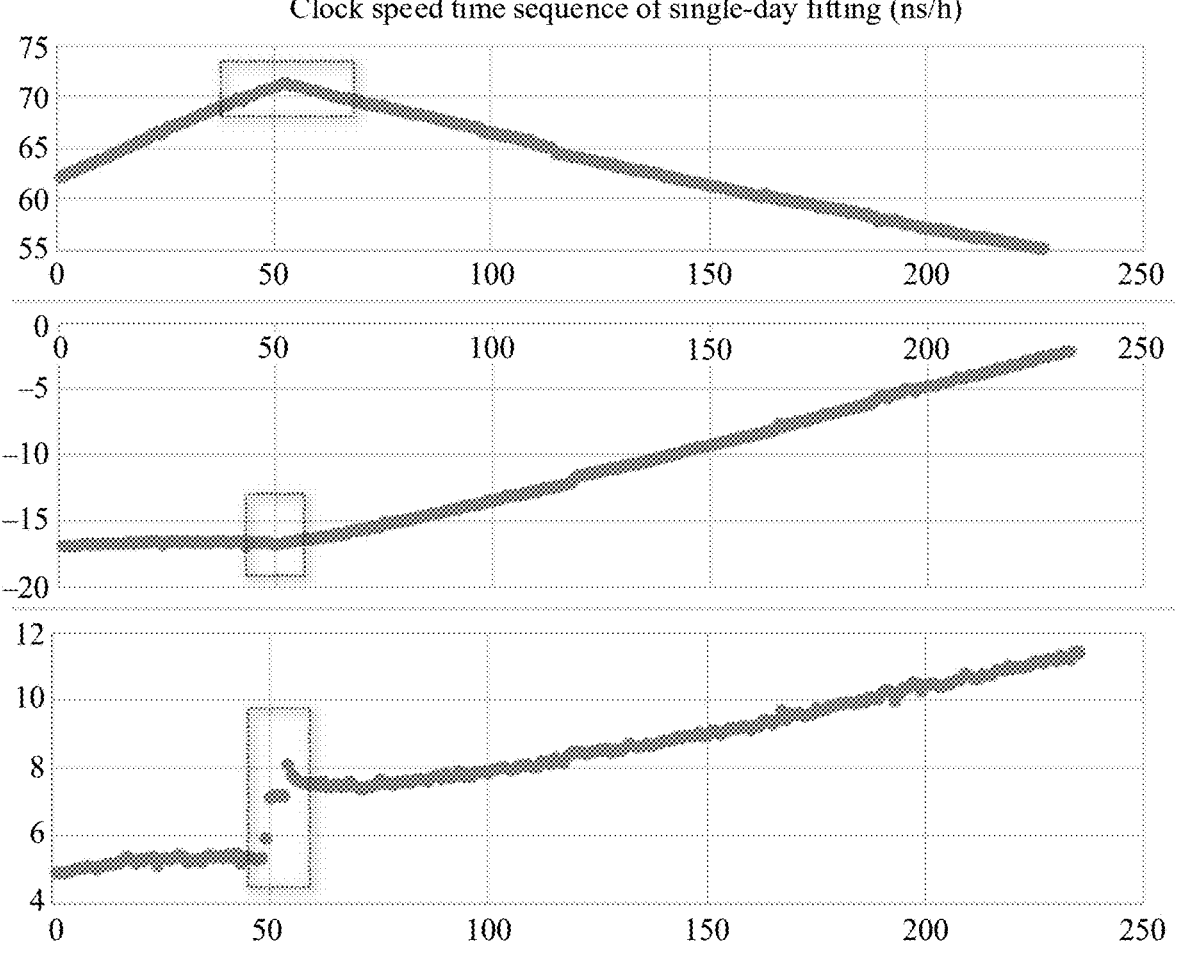
FIG. 7 is a clock speed time sequence of some satellites for 235 days according to an embodiment of this application.

It may be understood that the server may obtain clock error model coefficients $a_0$ and at of each satellite of a plurality of days based on the satellite clock error data of each satellite every day. For example, FIG. 7 shows a clock speed time sequence of some satellites of 235 days.

Step S505: The server obtains a clock speed change rate of each satellite through fitting based on the clock speed time sequence of each satellite.

In some embodiments, for each satellite, the clock speed time sequence may be fit by using a sliding window. To be specific, the sliding window is used to slide in the clock speed time sequence. In a sliding process of the sliding window, each time a quantity of clock speeds in the sliding window is greater than or equal to a preset quantity, a predicted clock speed at a next moment is predicted based on a clock speed in the sliding window at a current moment and a fitting result obtained through previous fitting.

Then, it is determined whether a difference between the predicted clock speed at the next moment and a clock speed to be added to the sliding window is less than or equal to a first preset threshold. If the difference between the predicted clock speed and the clock speed to be added to the sliding window is less than or equal to the first preset threshold, the clock speed to be added to the sliding window may participate in a fitting process of a next clock speed change rate. To be specific, after the clock speed to be added to the window is added to the sliding window, fitting is performed based on the clock speed in the sliding window, a clock speed change rate and a fitting residual of current fitting are obtained.

It should be noted that the clock speed to be added to the sliding window is a real clock speed at the next moment. For example, a clock speed time sequence of a satellite includes five clock speeds, and the five clock speeds are sequentially $b_1$, $b_2$, $b_3$, $b_4$, and $b_5$ in a time sequence. To be specific, in the clock speed time sequence, a clock speed value corresponding to $t_1$ is $b_1$, a clock speed value corresponding to $t_2$ is $b_2$, a clock speed value corresponding to $t_3$ is $b_3$, and a clock speed value corresponding to $t_4$ is $b_4$, and a clock speed value corresponding to $t_5$ is $b_5$. At the moment $t_4$, clock speeds included in the sliding window are $b_1$, $b_2$, $b_3$, and $b_4$. A predicted clock speed at $t_5$ (that is, the next moment) is predicted based on the clock speeds in the sliding window at this time, and the predicted clock speed is $B_5$. In this case, the clock speed to be added to the sliding window is $b_5$. A difference between the predicted clock speed $B_5$ and a real clock speed $b_5$ at the moment $t_5$ is calculated, and it is determined whether the difference is less than or equal to the first preset threshold.

It is assumed that the difference between the predicted clock speed $B_5$ and the real clock speed $b_5$ at the moment $t_5$ is less than or equal to the first preset threshold, $b_5$ is added to the sliding window. In this case, clock speeds included in the sliding window are $b_1$, $b_2$, $b_3$, $b_4$, and $b_5$. Fitting is performed based on $b_1$, $b_2$, $b_3$, $b_4$, and $b_5$ in the sliding window at this moment, to obtain a current clock speed change rate and a fitting residual of current fitting.

After the current clock speed change rate and the fitting residual are obtained, it is further determined whether the fitting residual is less than or equal to a second preset threshold. If the fitting residual is less than or equal to the second preset threshold, the current clock speed change rate is used as a clock speed change rate of the satellite. In contrast, if the fitting residual is greater than the second preset threshold, it is considered that a coarse difference or the item $a_1$ jumps, and after the sliding window is reset, the sliding window continues to slide forward. In the sliding process, fitting and determining are performed according to the foregoing process until the clock speed time sequence is traversed or the fitting residual is less than or equal to the second preset threshold.

If the difference between the predicted clock speed and the clock speed to be added to the sliding window is greater than the first preset threshold, the sliding window is reset and the sliding window continues to slide forward until the clock speed time sequence is traversed or the fitting residual is less than or equal to the second preset threshold.

It should be noted that, the first preset threshold, the second preset threshold, and the preset quantity may be set according to an actual requirement, which is not limited herein.

For example, a size of the sliding window is 5, in other words, a quantity of clock speeds that can be accommodated in the sliding window is preset to 5. In addition, it is set that when the quantity of clock speeds in the sliding window is greater than or equal to 3, fitting and prediction start to be performed based on the clock speeds in the sliding window. To be specific, the preset quantity is 3, and each time the quantity of clock speeds in the sliding window is greater than or equal to 3, fitting and prediction start to be performed based on the clock speeds in the sliding window.

It is assumed that a clock speed time sequence of a satellite includes 100 clock speeds, to be specific, clock speed values corresponding to moments $t_1$, $t_2$, $t_3$, . . . , and $t_{100}$ are $b_1$, $b_2$, $b_3$, . . . , and $b_{100}$ respectively. At an initial moment, the quantity of clock speeds in the sliding window is 0, in other words, there is no clock speed in the sliding window. The sliding window continues to slide forward, and it is determined whether the quantity of clock speeds included in the sliding window is greater than or equal to 3. At a moment, the sliding window includes a total of five clock speed values, namely, $b_5$, $b_6$, $b_7$, $b_8$, and $b_9$. In this case, a predicted clock speed B10 at a next moment (that is, $t_{10}$) is predicted based on the five clock speed values, namely, $b_5$, $b_6$, $b_7$, $b_8$, and $b_9$.

Then, a difference between the predicted clock speed $B_{10}$ and a real clock speed $b_{10}$ is calculated, and it is determined whether the difference is less than or equal to the first preset threshold. Tithe difference is less than or equal to the first preset threshold, a real clock speed $b_{11}$ at a next moment is added to the sliding window. In this case, a maximum quantity of clock speeds in the sliding window is 5. Therefore, one clock speed needs to be removed, and the clock speed $b_{10}$ at the next time needs to be added to the sliding window. It is assumed that after $b_{10}$ is added to the sliding window, the clock speed values included in the sliding window are $b_6$, $b_7$, $b_8$, $b_9$, and $b_{10}$, and fitting is performed based on the clock speed values in the sliding window at this moment to obtain a clock speed change rate and fitting residual. Then, it is further determined whether a fitting residual of current fitting is less than or equal to the second preset threshold.

If the difference between the predicted clock speed $B_{10}$ and the real clock speed $b_{10}$ is greater than the first preset threshold, the sliding window is reset. Resetting the sliding window means resetting a quantity of clock speeds in the sliding window, to be specific, the reset sliding window does not include any clock speed. After the sliding window is reset, the sliding, window continues to slide forward based on a sliding step size, and in a sliding process, it continues to be determined whether the quantity of clock speeds in the sliding window is greater than or equal to 3. If the quantity of clock speeds in the sliding window at a moment is greater than or equal to 3, a predicted clock speed at a next moment is predicted based on the clock speeds in the sliding window at the moment, a difference between the predicted clock speed and the real clock speed is calculated, and the difference is compared with the first preset threshold. This process is repeated until the clock speed time sequence is traversed, or a fitting residual of a clock speed change rate fitting process is less than or equal to the second preset threshold.

It can be learned from the foregoing that, in this embodiment, the clock speed change rate is fitted based on the clock speed time sequence, and abnormality detection is performed, by using the sliding window, on the clock speeds and the fitting residual that are for fitting prediction, which improves accuracy of the clock speed change rate, and further improves precision and reliability of clock error prediction of a candidate satellite.

Certainly, in some other embodiments, an existing clock speed change rate fitting manner may be used.

Step S506: The server obtains a predicted clock error of each satellite in a preset future time period based on an initial clock error value, a clock speed, and the clock speed change rate of each satellite.

During specific application, after fitting the clock speed change rate based on the clock speed time sequence of each satellite, the server performs satellite clock error prediction based on the satellite clock error $a_0$ (that is, the initial clock error value) of reference time, the clock speeds obtained through fitting, and the clock speed change rate, to obtain the predicted clock error of each satellite in the preset future time period.

It can be learned from the foregoing that an improved satellite clock error prediction procedure provided in embodiments of this application can further improve precision and reliability of satellite clock error prediction.

An ephemeris prediction procedure includes a clock error prediction procedure and an orbit prediction procedure. The ephemeris prediction procedure is described below.

FIG. 8 is a schematic flowchart of an ephemeris prediction method according to an embodiment of this application. As shown in FIG. 8, the procedure may include the following steps.

Step S801: A server obtains EOP data and historical ephemeris data of a preset time period.

It should be noted that the historical ephemeris data may include precise ephemeris data, may include real-time broadcast ephemeris data, or may include an original carrier phase observation quantity. The historical ephemeris data may be a data source in a PGNSS.

Generally, the historical ephemeris data includes satellite orbit data and satellite clock error data. The satellite orbit data includes satellite position information of each satellite at each moment, and the satellite clock error data includes satellite clock error information of each satellite at each moment. The satellite orbit data and earth orientation parameter (Earth Orientation Parameter, EOP) data may be used for satellite orbit prediction, and the satellite clock error data may be used for satellite clock error prediction. The satellite clock error data may be the historical satellite clock error data in FIG. 5 above.

For example, when the historical ephemeris data includes precise ephemeris data, the precise ephemeris data may include a precise orbit product and a precise clock error product. The precise orbit product and an EOP file are used for satellite orbit prediction, and the precise clock error product is used for satellite clock error prediction.

During specific application, the server may download the precise orbit product and the precise clock error product from a file transfer protocol (File Transfer Protocol, FTP) server of an international GNSS service (International GNSS Service, IGS), and download the EOP file from a server of an international earth rotation service (International Earth Rotation Service, IERS).

The preset time period may be set according to an actual requirement. For example, the preset time period is two days, to be specific, the server obtains historical ephemeris data of two days.

When obtaining the satellite orbit data, the server may obtain satellite orbit data of one or more days, and perform satellite orbit prediction based on the satellite orbit data of one or more days. Optionally, in embodiments of this application, optimal fitting duration may be set to two days, to estimate a satellite orbit dynamic parameter more accurately, which improves precision of satellite orbit prediction. In other words, the server obtains satellite orbit data of two consecutive days, and uses the satellite orbit data of the two consecutive days to perform satellite orbit prediction. Compared with using satellite orbit data of one day or at least three days to perform satellite orbit prediction, the former has higher precision of satellite orbit prediction.

Step S802: The server performs satellite orbit prediction and satellite clock error prediction based on the EOP data and the historical ephemeris data, to obtain a predicted orbit and a predicted clock error in a preset future time period.

It may be understood that the server may use the EOP data and the satellite orbit data in the historical ephemeris data to perform satellite orbit prediction, and use the satellite clock error data in the historical ephemeris data to perform satellite clock error prediction.

It should be noted that the preset future time period may be set according to an actual requirement. For example, the preset future time period may be 7 to 28 days, that is, the server may predict a satellite orbit and a satellite clock error in the future 7 to 28 days.

A satellite orbit prediction procedure and a satellite clock error prediction procedure are separately described below.

In some embodiments, to improve precision of satellite orbit prediction, an embodiment of this application provides an improved satellite orbit prediction procedure. In the satellite orbit prediction procedure, different solar radiation pressure models may be used for different types of satellites. For the satellite orbit prediction procedure, refer to a schematic block diagram of a satellite orbit prediction procedure shown in FIG. 9. As shown in FIG. 9, the procedure may include the following steps.

Step S901: The server converts, based on the EOP data, satellite position information in an earth-fixed system into satellite position information in an inertial system.

The satellite orbit data includes the satellite position information in the earth-fixed system. The satellite orbit data may be a precise orbit product.

It should be noted that, to estimate a satellite orbit dynamic parameter more accurately, the server may perform satellite orbit prediction based on satellite orbit data of two consecutive days, in other words, optimal fitting estimation duration is set to two days.

Step S902: The server determines, based on a correspondence between a satellite type and a solar radiation pressure model, a target solar radiation pressure model corresponding to each satellite in the satellite orbit data.

It should be noted that the correspondence between a satellite type and a solar radiation pressure model is preset, in other words, a solar radiation pressure model used by each type of satellite is determined in advance.

For example, the correspondence between a satellite type and a solar radiation pressure model may be shown in the following Table 1.

TABLE 1

| Satellite type | Solar radiation pressure model |
|---|---|
| GPS satellite or GLONASS satellite | ECOM5 parameter model |
| Galileo (Galileo) satellite | Box-wing initial light pressure model and ECOM5 parameter model |
| BeiDou GEO satellite | Initial light pressure model, ECOM5 parameter model, and periodic empirical force parameter |
| BeiDou IGSO satellite or BeiDou MEO satellite | ECOM5 parameter model |
| QZSS satellite | Initial light pressure model and ECOM5 parameter model |

According to Table 1, when a satellite type of a satellite is a GPS satellite or a GLONASS satellite, a target solar radiation pressure model of the satellite is an ECOM5 parameter model. Similarly, when a satellite type of a satellite is a QZSS satellite, a target light pressure model of the satellite is an initial light pressure model and an ECOM5 parameter model.

It may be understood that the satellite orbit data includes three-dimensional position information of each satellite at each moment, and the satellite orbit data includes identification information of each satellite. The identification information may be, for example, a satellite number. The server determines a satellite type of each satellite in the satellite orbit data based on the identification information such as the satellite number in the satellite orbit data, and then determines, based on the satellite type of each satellite and the preset correspondence between a satellite type and a solar radiation pressure model, a target solar radiation pressure model corresponding to each satellite.

In contrast, precision of satellite orbit prediction can be improved by using different solar radiation pressure models for different types of satellites.

Step S903: The server establishes a satellite motion equation and a variational equation of each satellite based on the target solar radiation pressure model of each satellite and the satellite position information in the inertial system.

It may be understood that for a single satellite, the server establishes the satellite motion equation and the variational equation of the satellite based on the target solar radiation pressure model of the satellite and the satellite position information of the satellite in the inertial system.

Step S904: The server obtains, based on the motion equation and the variational equation of each satellite, a reference orbit position, a speed, and a state transfer matrix of each satellite at each moment in a numerical integration manner.

In a process of obtaining the reference orbit position, the speed, and the state transfer matrix at each moment in the numerical integral manner, the server needs to obtain a reference orbit position, a speed, and a state transfer matrix at a current moment based on information such as a position, a speed, and a state transfer matrix of a reference orbit at a previous moment.

Step S905: The server obtains, based on the satellite orbit data, the reference orbit position, and the state transfer matrix, satellite orbit status parameters of each satellite at a reference moment by using a least square integral solution. The satellite orbit status parameters at the reference moment may include, but are not limited to, a satellite position, a speed, a dynamic model parameter, and an empirical force parameter at the reference moment.

Step S906: The server obtains a satellite orbit in a preset future time period in a numerical integral manner based on the satellite orbit status parameters at the reference moment and a satellite dynamic model. In this case, the obtained satellite orbit in the preset future time period is a satellite orbit in the inertial system.

Step S907: The server converts, based on the EOP data, a satellite orbit in the preset future time period in the inertial system into the earth-fixed system, to obtain a predicted orbit in the preset future time period.

During specific application, the server may convert, based on an EOP prediction value in the FOP data, the satellite orbit of the inertial system obtained in step S906 into the earth-fixed system.

It can be seen from the above that, in the satellite orbit prediction procedure, different solar radiation pressure models are used for different types of satellites, which improves precision of satellite orbit prediction. Further, optimal fitting duration is set to two days, to estimate a satellite orbit dynamic parameter more accurately, which further improves precision of satellite orbit prediction.

Certainly, in some other embodiments, an existing satellite orbit prediction manner may be used to perform satellite orbit prediction.

In other words, for the satellite orbit prediction procedure, the server may use the improved satellite orbit prediction procedure provided in embodiments of this application, or may use an existing satellite orbit prediction procedure.

Similarly, for the satellite clock error prediction procedure, the server may use the improved satellite clock error prediction procedure provided in embodiments of this application, or may use an existing satellite clock error prediction procedure. The improved satellite clock error prediction procedure provided in embodiments of this application is shown in FIG. 5. For a specific description, refer to related content in FIG. 5 above. Details are not described herein again.

Step S803: After fitting the predicted orbit into an orbital parameter, the server encodes orbital parameters of satellites belonging to a same orbital plane to obtain an orbital parameter code of each orbital plane.

Step S804: After fitting the predicted clock error into a clock error parameter, the server encodes the clock error parameter to obtain a clock error parameter code.

During specific application, for the predicted clock error, after fitting the predicted clock error into the clock error parameter, the server encodes the clock error parameter to obtain the clock error parameter code.

For the predicted orbit, to send the predicted orbit to a terminal device, the server may perform segment fitting on the predicted orbit by using a group of Kepler orbital parameters, to obtain an orbital parameter of each segment of the predicted orbit.

A process in which the server fits the predicted orbit into the orbital parameter may be as follows:

First, the server performs equal-interval sampling on the predicted orbit to obtain the satellite position of each sampling point. A sampling interval may be set according to an actual requirement, for example, the sampling interval may be 5 minutes. To be specific, the server performs sampling once every 5 minutes. In this case, it is assumed that the initial sampling point is $T_0$, a predicted orbit position corresponding to a moment $T_0$ is $(x_0, y_0, z_0)$, a next sampling point is $T_1$, $T_1=T_0+5$, a predicted orbit position corresponding to a moment T1 is $(x1, y1, z1)$, and so on, until sampling is completed. After the sampling is completed, a plurality of sampling points and a predicted orbit position corresponding to each sampling point are obtained.

Then, the server segments the plurality of sampling points according to time, to obtain a segmentation result. For example, segmentation is performed by using four hours, and a segmentation result obtained through sampling at an interval of five minutes is shown in Table 2.

TABLE 2

| Time | X-coordinate value | Y-coordinate value | Z-coordinate value |
|---|---|---|---|
| $T_0$ | $X_0$ | $Y_0$ | $Z_0$ |
| $T_1$ | $X_1$ | $Y_1$ | $Z_1$ |
| ... | ... | ... | ... |
| $T_{48}$ | $X_{48}$ | $Y_{48}$ | $Z_{48}$ |

As shown in Table 2, there are a total of 240 minutes in four hours, and sampling is performed every five minutes. Therefore, there are a total of 49 sampling points, which are $T_0, T_1, \ldots, T_{48}$. The predicted orbit position corresponding to the moment $T_0$ is $(x_0, y_0, z_0)$, and a predicted orbit position corresponding to a moment $T_{48}$ is $(x_{48}, y_{48}, z_{48})$.

After the predicted orbit is sampled and segmented, a 16-parameter broadcast ephemeris model or an 18-parameter broadcast ephemeris model may be used, and fitting is performed on each segment of the predicted orbit to obtain a broadcast ephemeris parameter corresponding to each segment of the predicted orbit. A fitting algorithm such as a least square method may be used in a fitting process. For example, the 16-parameter broadcast ephemeris model may be shown in Table 3 below

TABLE 3

| $t_{oe}$ | Reference time |
|---|---|
| $\sqrt{a_s}$ | Square root of a semi-major axis of an orbit |
| $e_s$ | Eccentricity |
| $i_0$ | Orbital inclination at a reference moment |
| $\Omega_0$ | Right ascension of the orbital ascending node at time-of-week 0 |
| w | Angular distance of Perigee |
| $M_0$ | Mean anomaly at the reference moment |
| $\Delta n$ | Correction value for an average motion angular speed |
| idot | Change rate of the orbital inclination |
| $\dot{\Omega}$ | Change rate of the right ascension of the orbital ascending node |
| $C_{uc}$ | Amplitude of cosine harmonic correction of an angular distance of the ascending node |
| $C_{us}$ | Amplitude of sine harmonic correction of the angular distance of the ascending node |
| $C_{rc}$ | Amplitude of cosine harmonic correction of an orbital radius |
| $C_{rs}$ | Amplitude of sine harmonic correction of the orbital radius |
| $C_{ic}$ | Amplitude of cosine harmonic correction of the orbital inclination |

24

TABLE 3-continued

| $t_{oe}$ | Reference time |
|---|---|
| $C_{is}$ | Amplitude of sine harmonic correction of the orbital inclination. |

It should be noted that, after fitting the segments of the predicted orbit into the orbital parameter, the server may directly send the orbital parameter to the terminal device. However, there is a large amount of data of orbital ephemeris parameters, and direct sending of the orbital ephemeris parameters to the terminal device causes a large amount of parameter broadcast data.

To reduce the amount of parameter broadcast data without increasing encoding complexity, this embodiment of this application provides a manner of broadcasting ephemeris parameters based on an orbital plane. In this manner, orbital ephemeris parameters belonging to a same orbital plane are encoded, to obtain an orbital ephemeris parameter code of each orbital plane. Orbital ephemeris parameters of satellites on a same orbital plane have strong consistency, and therefore the orbital ephemeris parameters of the same orbital plane may be encoded.

Figure 10:
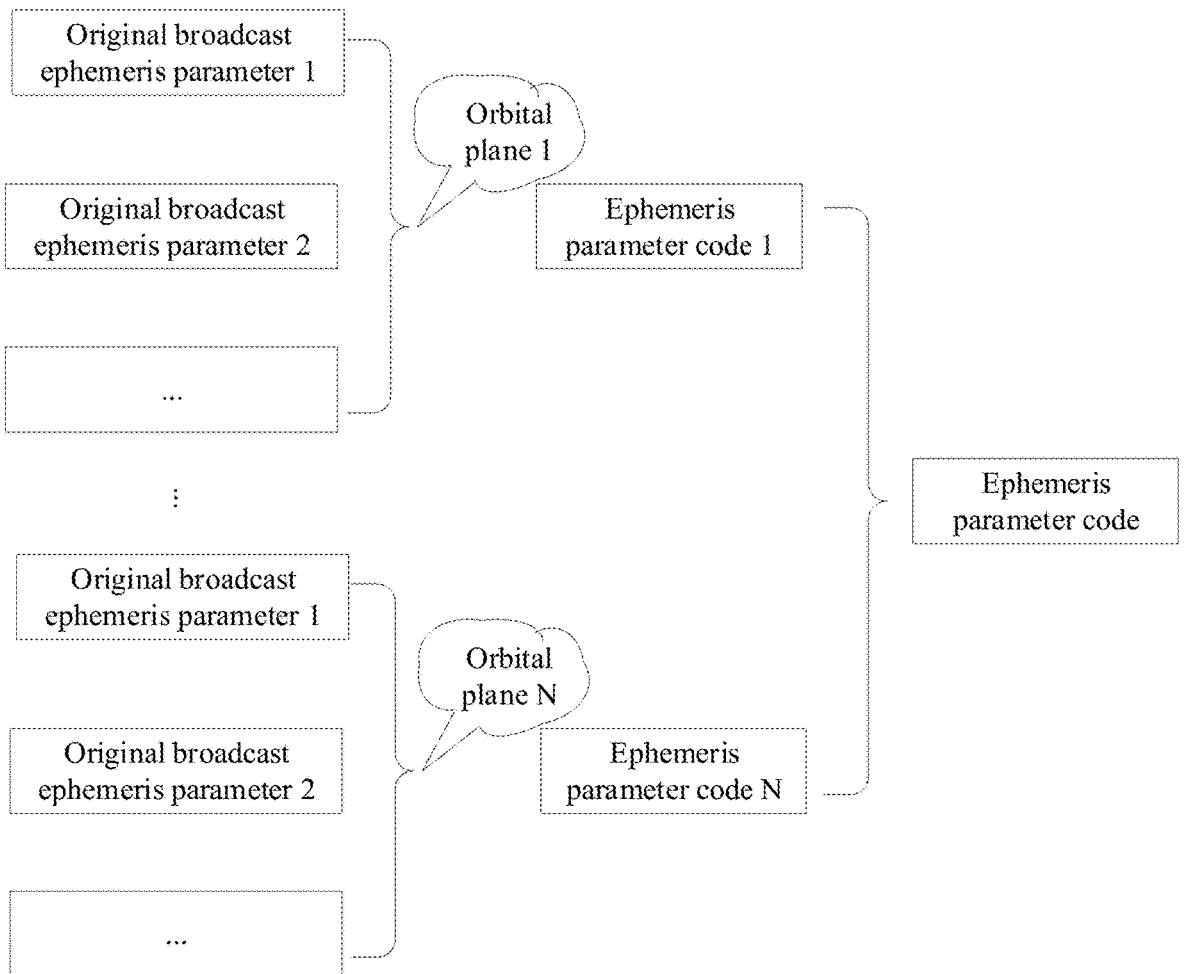
FIG. 10 is a schematic diagram of an orbital ephemeris parameter encoding scheme based on an orbital plane according to an embodiment of this application.

Specifically, the server first determines satellites that belong to a same orbital plane, and then encodes orbital parameters corresponding to satellites belonging to a same orbital plane, to obtain an orbital ephemeris parameter code of the orbital plane. For example, FIG. 10 is a schematic diagram of a manner of encoding orbital ephemeris parameters based on an orbital plane. As shown in FIG. 10, after an original broadcast ephemeris parameter of an orbital plane 1 is encoded, an ephemeris parameter code 1 of the orbital plane 1 is obtained. Similarly, after an original broadcast ephemeris parameter of an orbital plane N is encoded, an ephemeris parameter code N of the orbital plane N is obtained. The original broadcast ephemeris parameter refers to an ephemeris parameter obtained by performing segment fitting on the predicted orbit and the predicted clock error by the server by using a Kepler orbital parameter.

After obtaining the ephemeris parameter code 1, . . . , and the ephemeris parameter code N, the server sends the ephemeris parameter code 1, . . . , and the ephemeris parameter code N to the terminal device, instead of sending the original broadcast ephemeris parameter to the terminal device. In this way, an amount of data of ephemeris parameter broadcast can be reduced. For example, Table 4 below shows a comparison between an amount of data broadcast based on an original broadcast ephemeris parameter and an amount of data broadcast based on an orbital plane.

TABLE 4

| Broadcast mode | Weekly amount of data of a single constellation/kb |
|---|---|
| Broadcast based on an original broadcast ephemeris parameter | 54.35 |
| Broadcast based on an orbital plane | 44.92 |

It can be learned from the foregoing Table 4 that, the amount of data of a broadcast manner based on an orbital plane is smaller than that of a broadcast manner based on an original broadcast ephemeris parameter.

It should be noted that, when original ephemeris parameters of a same orbital plane are encoded, an original ephemeris parameter of one satellite may be normally encoded first, and then ephemeris parameters of other satellites on the same orbital plane are incrementally encoded based on the normally encoded ephemeris parameter of the satellite, to finally obtain the ephemeris parameter code of the orbital plane.

For example, the orbital plane 1 includes three satellites. One of the three satellites is selected as a target satellite, and an original broadcast ephemeris parameter of the target satellite is normally encoded, to obtain an ephemeris parameter code of the target satellite. For two satellites other than the target satellite, incremental encoding is performed based on the ephemeris parameter code of the target satellite.

Step S805: The server sends an ephemeris parameter code to the terminal device, where the ephemeris parameter code includes the clock error parameter code and the orbital parameter code of each orbital plane.

It may be understood that the terminal device may obtain the predicted orbit and the predicted clock error from the server in a network request manner. After receiving a request of the terminal device, the server may send the clock error parameter code and the orbital parameter code of each orbital plane to the terminal device in response to the request.

After obtaining the ephemeris parameter code, the terminal device decodes the orbital parameter code to obtain an orbital ephemeris parameter of each satellite, calculates positions, speeds, and clock errors of all visible GNSS satellites based on the broadcast ephemeris parameter and the clock error parameter, and finally determines a current position and/or a current speed based on the positions and speeds of the visible GNSS satellites, an observation quantity, and the like.

It can be learned from the foregoing that, in embodiments of this application, after the predicted orbit is segmented and fitted into a broadcast ephemeris parameter, an orbital ephemeris parameter is encoded based on an orbital plane, to obtain an orbital ephemeris parameter code of each orbital plane, so that an amount of data of parameter broadcast can be effectively reduced.

Further, an embodiment of this application further provides an improved satellite orbit prediction procedure, to improve precision of satellite orbit prediction.

Further, an embodiment of this application further provides an improved satellite clock error prediction procedure, to improve precision and reliability of satellite clock error prediction.

Figure 11:
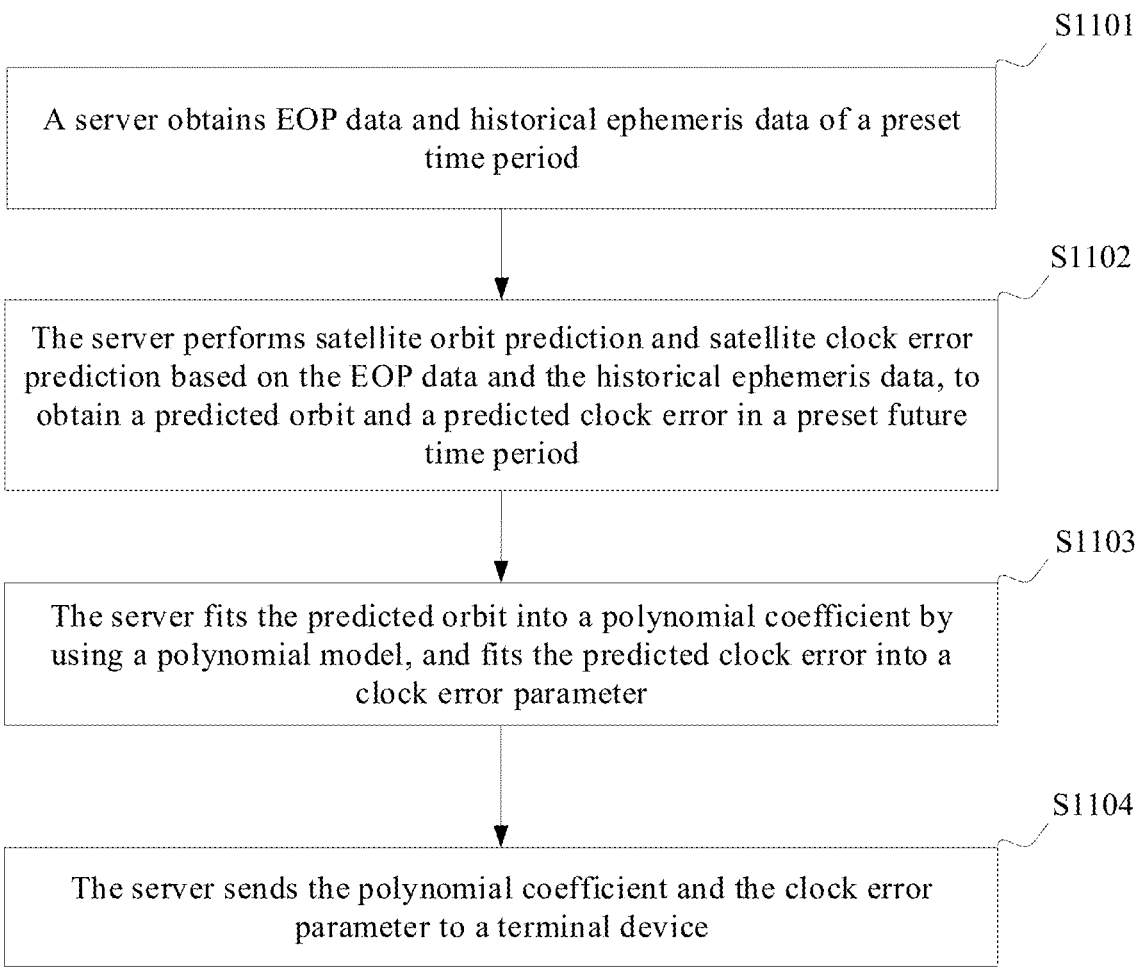
FIG. 11 is another schematic block diagram of a procedure of an ephemeris prediction method according to an embodiment of this application.

In some embodiments, an embodiment of this application provides another ephemeris prediction solution. FIG. 11 is another schematic block diagram of a procedure of an ephemeris prediction method according to an embodiment of this application. The ephemeris prediction method may include the following steps.

Step S1101: A server obtains FOP data and historical ephemeris data of a preset time period.

Step S1102: The server performs satellite orbit prediction and satellite clock error prediction based on the EOP data and the historical ephemeris data, to obtain a predicted orbit and a predicted clock error in a preset future time period.

It should be noted that, for related descriptions of step S1101 and step S1102, refer to the foregoing step S801 and step S802. Details are not described herein again.

When performing satellite orbit prediction, the server may perform satellite orbit prediction in an existing satellite orbit prediction manner, or may perform satellite orbit prediction in an improved satellite orbit prediction manner provided in embodiments of this application.

When performing satellite clock error prediction, the server may perform satellite clock error prediction in an existing satellite clock error prediction manner, or may perform clock error prediction in an improved satellite clock error prediction manner provided in embodiments of this application. For the improved satellite orbit prediction procedure, refer to FIG. 9 and related content. For the improved satellite clock error prediction procedure, refer to FIG. 5 and related content. Details are not described herein again.

Step S1103: The server fits the predicted orbit into a polynomial coefficient by using a polynomial model, and fits the predicted clock error into a clock error parameter.

It should be noted that the polynomial model includes a basis function and a coefficient of the basis function. For example, the polynomial model is a Chebyshev polynomial model, and a basis function of the polynomial model is:

$$T_0(x)=1, T_1(x)=x, \text{ and } T_n(x)=2xT_{n-1}(x)-T_{n-2}(x), \text{ where } n \text{ is greater than or equal to } 2. \quad (5)$$

n represents a basis function order.

A GNSS satellite position may be represented by using a basis function. For example, when the basis function is the foregoing Formula (5), a satellite position may be:

$$x(t) = \sum_{i=0}^{n} a_{xi} T_i(t), \quad (6)$$

$$y(t) = \sum_{i=0}^{n} a_{yi} T_i(t), \text{ and}$$

$$z(t) = \sum_{i=0}^{n} a_{zi} T_i(t)$$

x(t), y(t), and z(t) represent three-dimensional satellite positions.

A process in which the server fits the predicted orbit into the polynomial coefficient by using a polynomial may include:

First, the server performs equal-interval sampling and segmentation on the predicted orbit to obtain a segmentation result. For descriptions of sampling and segmentation, refer to related content in step S503. Details are not described herein again.

Then, after selecting an appropriate basis function order n, the server uses a basis function to represent a satellite position at each sampling point, to determine a basis function coefficient corresponding to the satellite position at each sampling point.

For example, a segmentation result of a segment of a predicted orbit is shown in Table 2, the foregoing Formula (6) is used to separately represent predicted orbit positions corresponding to moments $T_0$, $T_1$, . . . , and $T_{48}$, and based on X-coordinate values, Y-coordinate values, and Z-coordinate values corresponding to each moment, basis function coefficients corresponding to the moments $T_0$, $T_1$, . . . , and $T_{48}$ are determined.

In addition, the server fits the predicted clock error into the clock error parameter.

Step S1104: The server sends the polynomial coefficient and the clock error parameter to a terminal device.

It may be understood that the terminal device may obtain the predicted orbit and the predicted clock error from the server in a network request manner. After receiving a request of the terminal device, the server may send the polynomial coefficient and the clock error parameter to the terminal device in response to the request.

Specifically, the terminal device receives the polynomial coefficient and the clock error parameter from a generator. After obtaining the polynomial coefficient, the terminal device may calculate a satellite clock error of a visible GNSS satellite based on the clock error parameter, calculate a position of the GNSS satellite based on the basis function and the polynomial coefficient, and calculate a speed of the GNSS satellite based on the polynomial coefficient and a basis function derivative.

The basis function derivative may be, for example:

$$F_0(x){=}0, F_1(x){=}1, \text{ and } F_n(x){=}2T_{n-1}(x){+}2xF_{n-1}(x){-}F_{n-2}(x), \text{ where } n \text{ is greater than or equal to } 2. \quad (7)$$

The speed of the GNSS satellite may be calculated by using the basis function derivative shown in Formula (7), as shown in Formula (8):

$$v_x(t) = \sum_{i=0}^{n} a_{xi}F_i(t), \quad (8)$$

$$v_y(t) = \sum_{i=0}^{n} a_{yi}F_i(t), \text{ and}$$

$$v_z(t) = \sum_{i=0}^{n} a_{zi}F_i(t)$$

It should be noted that, a polynomial model is used to fit a predicted orbit into a polynomial coefficient, so that an operation amount, a time consumed for operations, and power consumption of a GNSS chip in a positioning process of the terminal device can be reduced.

Specifically, when the server uses a Kepler parameter to fit segments of the predicted orbit into a broadcast ephemeris parameter, after receiving the broadcast ephemeris parameter of the server, the terminal device calculates positions and speeds of all visible GNSS satellites based on the broadcast ephemeris parameter. In one aspect, a process in which the terminal device calculates a position and a speed of a single GNSS satellite based on the broadcast ephemeris parameter involves many complex floating-point operations. As a result, an operation amount is large, and a large quantity of processor resources are occupied. In another aspect, a quantity of visible GNSS satellites in each current positioning epoch is up to 50 or more. It can be learned that when a quantity of GNSS satellites is larger, the operation amount is larger. For example, it is assumed that the terminal device performs positioning once per second, and the terminal device needs to perform more than 50 position resolving processes and more than 50 speed resolving processes for GNSS satellites per second. Therefore, the operation amount is extremely large, and power consumption is high.

In other words, when the terminal device calculates the positions and speeds of the GNSS satellites based on the broadcast ephemeris parameter, an operation amount is large, a time consumed for operations is long, and power consumption of the GNSS chip is high.

However, in embodiments of this application, the predicted orbit is segmented and fitted into a polynomial coefficient by using a polynomial model. After receiving the polynomial coefficient, the terminal device may calculate a position of a GNSS satellite based on only the polynomial coefficient and the basis function, and may calculate a speed of the satellite based on the polynomial coefficient and the basis function derivative. In a calculation process, a small quantity of floating-point operations are involved, so that an operation amount is reduced, a time consumed for calculation is reduced, and power consumption of the GNSS chip is reduced.

In addition, in the process of segmenting and fitting the predicted orbit, a fitting error increases with the increase of fitting duration. To ensure precision, in existing AGNSS and PGNSS solutions, fitting duration of each group of broadcast ephemeris parameters is usually four hours.

However, in embodiments of this application, the predicted orbit is segmented and fitted by using the polynomial model. When the basis function order n is 18, in a case of same precision, a validity time period of each group of parameters may be up to 12 hours. This means that a lower parameter update frequency may be used for the GNSS chip.

It can be learned from the foregoing that, on a side of a terminal device, in embodiments of this application, a polynomial model is used to fit a predicted orbit into a polynomial coefficient, so that an operation amount in a positioning process of a terminal device is effectively reduced, to reduce power consumption in a GNSS positioning process.

Further, an embodiment of this application further provides an improved satellite orbit prediction procedure, to improve precision of satellite orbit prediction.

Further, an embodiment of this application further provides an improved satellite clock error prediction procedure, to improve precision and reliability of satellite clock error prediction.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

In embodiments of this application, functional modules of a terminal and a server may be obtained through division based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely logical function division. In an actual implementation, there may be another division manner. An example in which each functional module is obtained through division based on each corresponding function is used below for description.

Figure 12:
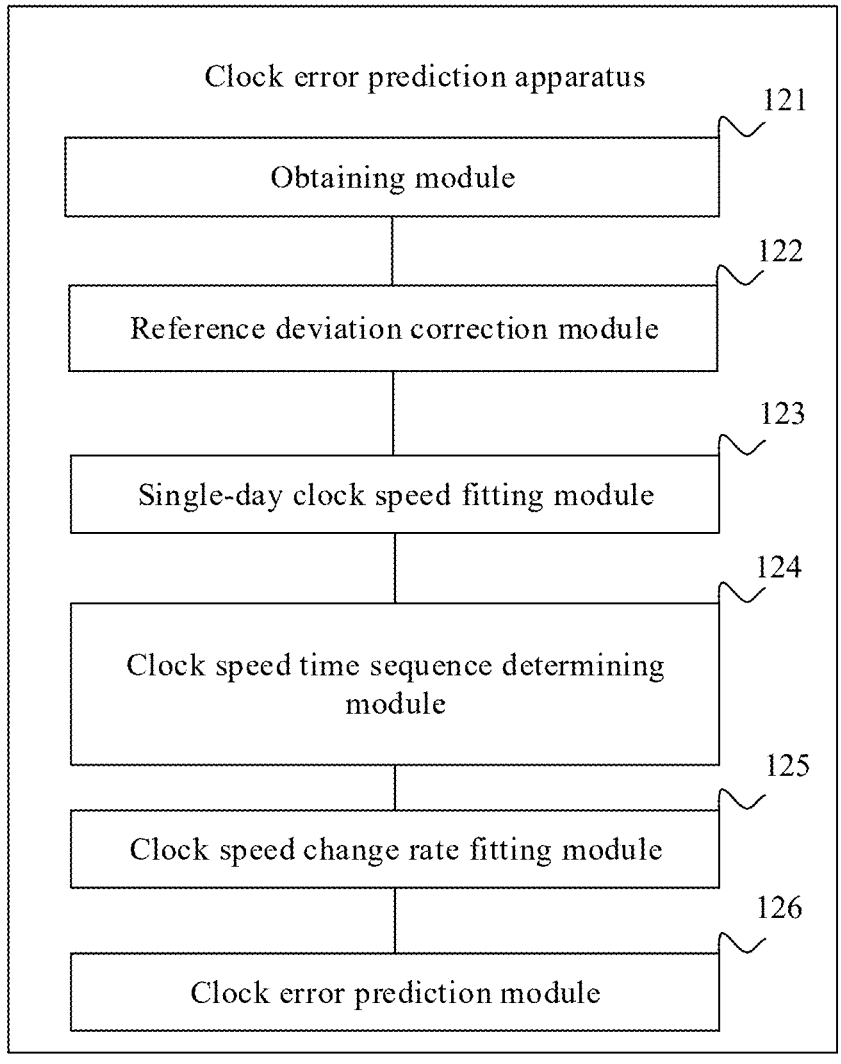
FIG. 12 is a schematic structural block diagram of a clock error prediction apparatus according to an embodiment of this application.

FIG. 12 is a schematic block diagram of a clock error prediction apparatus according to an embodiment of this application. The apparatus may be used in a server, and the apparatus may include:

an obtaining module 121, configured to obtain historical satellite clock error data of a preset time period, where the historical satellite clock error data includes broadcast ephemeris clock error data and precise ephemeris clock error data;

a reference deviation correction module 122, configured to correct a reference deviation of the precise ephemeris clock error data based on the broadcast ephemeris clock error data to obtain corrected precise ephemeris clock error data;

a single-day clock speed fitting module 123, configured to obtain a single-day clock speed of each satellite through fitting based on single-day clock error data in the corrected precise ephemeris clock error data of each satellite;

a clock speed time sequence determining module 124, configured to obtain a clock speed time sequence of each satellite based on the single-day clock speed of each satellite;

a clock speed change rate fitting module 125, configured to obtain a clock speed change rate of each satellite through fitting based on the clock speed time sequence of each satellite; and a clock error prediction module 126, configured to obtain a predicted clock error of each satellite in a preset future time period based on an initial clock error value, a clock speed, and the clock speed change rate of each satellite.

In some possible implementations, the reference deviation correction module is specifically configured to:

calculate a difference between a broadcast ephemeris clock error sequence and a precise ephemeris clock error sequence of a same epoch to obtain a difference sequence of each epoch, where the broadcast ephemeris clock error data includes broadcast ephemeris clock error sequences of epochs, and the precise ephemeris clock error data includes precise ephemeris clock error sequences of the epochs;

determine an average value and a standard deviation of each difference sequence;

for each difference sequence, remove, from the difference sequence based on the average value and the standard deviation, a difference point that does not meet a preset condition, to obtain a target difference sequence;

calculate a reference deviation based on the target difference sequence; and calculate a difference between the precise ephemeris clock error data and the reference deviation to obtain the corrected precise ephemeris clock error data.

In some possible implementations, the reference deviation correction module is specifically configured to:

calculate the reference deviation by using $$b(t) = \frac{1}{N} \sum_{i=1}^{i=N} dclk_i,$$

where

N is a quantity of clock error difference points included in the target difference sequence, b(t) is the reference deviation, and $dclk_i$ is an $i^{th}$ clock error difference point in the target difference sequence.

In some possible implementations, the reference deviation correction module is specifically configured to:

determine, based on the average value and the standard deviation, whether each difference point in the difference sequence satisfies $$\left| \frac{x - \mu}{\delta} \right| > 3,$$

where x is the difference point in the difference sequence, μ is the average value of the difference sequence, and δ is the standard deviation of the difference sequence;

if the difference point satisfies the formula, determine that the difference point does not meet the preset condition, and remove the difference point that does not meet the preset condition, to obtain a difference sequence after elimination of the difference point; and after an average value and a standard deviation of the difference sequence after elimination of the difference point are determined, use the difference sequence after elimination of the difference point as the difference sequence, return to the step of determining, based on the average value and the standard deviation, whether each difference point in the difference sequence satisfies $$\left| \frac{x - \mu}{\delta} \right| > 3,$$

until no difference point in the difference sequence meets the preset condition, and use the difference sequence with no difference point meeting the preset condition as the target difference sequence.

In some possible implementations, the single-day clock speed fitting module is specifically configured to:

perform, for each satellite, coarse difference detection on the single-day clock error data in the corrected precise ephemeris clock error data, to obtain single-day clock error data after the coarse difference detection; and obtain the single-day clock speed of each satellite through fitting based on the single-day clock error data after the coarse difference detection.

In some possible implementations, the clock speed change rate fitting module is specifically configured to:

for each satellite, fit the clock speed time sequence by using a sliding window;

in a sliding process of the sliding window, each time a quantity of clock speeds in the sliding window is greater than or equal to a preset quantity, predict a predicted clock speed at a next moment based on a clock speed in the sliding window at a current moment and a fitting result obtained through previous fitting;

when a difference between the predicted clock speed at the next moment and a clock speed to be added to the sliding window is less than or equal to a first preset threshold, after the clock speed to be added to the sliding window is added to the sliding window, obtain a current clock speed change rate through fitting based on the clock speed in the sliding window, and obtain a fitting residual;

if the fitting residual is less than or equal to a second preset threshold, use the current clock speed change rate as the clock speed change rate;

if the fitting residual is greater than the second preset threshold, reset the sliding window and make the sliding window continue to slide forward until the clock speed time sequence is traversed or the fitting residual is less than or equal to the second preset threshold; and when the difference between the clock speed at the next moment and the clock speed to be added to the sliding window is greater than the first preset threshold, reset the sliding window and make the sliding window continue to slide forward until the clock speed time sequence is traversed or the fitting residual is less than or equal to the second preset threshold.

It should be noted that content such as information exchange between the foregoing apparatuses/modules and an execution process thereof is based on a same concept as the method embodiments of this application. For details about specific functions and technical effects of the content, refer to the method embodiments. The details are not described herein again.

The terminal device provided in embodiments of this application may include a memory, a processor, and a computer program that is stored in the memory and that, can be run on the processor. When executing the computer program, the processor implements the method according to any one of the method embodiments on the side of the terminal device.

An embodiment of this application provides a server, including a memory, a processor, and a computer program that is stored in the memory and that can be run on the processor. When executing the computer program, the processor implements the method according to any one of the method embodiments on the side of the server.

An embodiment of this application further provides an ephemeris prediction system. The system includes a server and a terminal device. The server is configured to implement the method according to any one of the embodiments on the side of the server. The terminal device is configured to implement the method according to any one of the foregoing method embodiments on the side of terminal device.

An embodiment of this application further provides a computer-readable storage medium. The computer-readable storage medium stores a computer program. When the computer program is executed by a processor, steps in the foregoing method embodiments can be implemented.

An embodiment of this application provides a computer program product. When the computer program product runs on an electronic device, the electronic device is enabled to implement the steps in the foregoing method embodiments when executing the computer program product. The electronic device may be a server or a terminal device.

An embodiment of this application further provides a chip system. The chip system includes a processor, the processor is coupled to a memory, and the processor executes a computer program stored in the memory, to implement the method in the foregoing method embodiments. The chip system may be a single chip or a chip module including a plurality of chips.

In the foregoing embodiments, the description of each embodiment has respective focuses. For a part that is not described in detail or recorded in an embodiment, refer to related descriptions in other embodiments. It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application. In addition, in the descriptions of the specification and claims of this application, the terms "first", "second", "third", and the like are merely intended for the purpose of differentiated description, but shall not be understood as an indication or an implication of relative importance. Reference to "an embodiment", "some embodiments", or the like described in the specification of this application indicates that one or more embodiments of this application include a specific feature, structure, or characteristic described with reference to the embodiments. Therefore, statements such as "in an embodiment" "in some embodiments", "in some other embodiments", and "in other embodiments" that appear at different places in this specification do not necessarily refer to a same embodiment. Instead, the statements mean "one or more but not all of embodiments", unless otherwise specifically emphasized in another manner.

In conclusion, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
receiving, by a server and from a terminal device, a positioning request;
obtaining, by the server and in response to the positioning request, historical satellite clock error data of a preset time period, wherein the historical satellite clock error data comprises broadcast ephemeris clock error data and precise ephemeris clock error data;
correcting, by the server and based on the broadcast ephemeris clock error data, a reference deviation of the precise ephemeris clock error data to obtain corrected precise ephemeris clock error data;
obtaining, by the server and through fitting based on single-day clock error data in the corrected precise ephemeris clock error data, a single-day clock speed of a satellite;
obtaining, by the server and based on the single-day clock speed, a clock speed time sequence of the satellite;
obtaining, by the server and through fitting based on the clock speed time sequence, a clock speed change rate of the satellite;
obtaining, by the server and based on an initial clock error value, a clock speed, and the clock speed change rate, a predicted clock error of the satellite in a preset future time period; and
sending, by the server and to the terminal device, the predicted clock error to instruct the terminal device to perform a positioning process.

2. The method of claim 1, wherein correcting the reference deviation comprises:
calculating a first difference between a broadcast ephemeris clock error sequence and a precise ephemeris clock error sequence of an epoch to obtain a difference sequence of the epoch, wherein the broadcast ephemeris clock error data comprises broadcast ephemeris clock error sequences of epochs, and wherein the precise ephemeris clock error data comprises precise ephemeris clock error sequences of the epoch;
calculating an average value and a standard deviation of the difference sequence;
removing, from the difference sequence based on the average value and the standard deviation, a difference point that does not meet a preset condition to obtain a target difference sequence;
calculating, based on the target difference sequence, an updated reference deviation; and
calculating a second difference between the precise ephemeris clock error data and the updated reference deviation to obtain the corrected precise ephemeris clock error data.

3. The method of claim 2, wherein calculating the reference deviation comprises calculating the reference deviation by using an equation:

$$b(t) = \frac{1}{N}\sum_{i=1}^{i=N} dclk_i,$$

wherein N is a quantity of clock error difference points comprised in the target difference sequence, b(t) is the reference deviation, and $dclk_i$ is an $i^{th}$ clock error difference point in the target difference sequence.

4. The method of claim 2, wherein removing the difference point comprises:

calculating, based on the average value and the standard deviation, whether each difference point in the difference sequence satisfies a formula:

$$\left|\frac{x-\mu}{\delta}\right| > 3,$$

wherein x is the difference point in the difference sequence, μ is the average value of the difference sequence, and δ is the standard deviation of the difference sequence;

removing, when the difference point satisfies the formula, the difference point from the difference sequence to obtain an updated difference sequence after elimination of the difference point;

calculating an updated average value and an updated standard deviation of the updated difference sequence; and after the updated average value and the updated standard deviation are calculated:

using the updated difference sequence as the difference sequence;

returning to the step of calculating, based on the updated average value and the updated standard deviation, whether each difference point in the updated difference sequence satisfies the formula until no difference point in the updated difference sequence satisfies the formula; and using the updated difference sequence as the target difference sequence.

5. The method of claim 1, wherein obtaining the single-day clock speed comprises:

performing coarse difference detection on the single-day clock error data to obtain updated single-day clock error data; and obtaining, through fitting based on the updated single-day clock error data, the single-day clock speed.

6. The method of claim 1, wherein obtaining the clock speed change rate comprises:

fitting, by using a sliding window, the clock speed time sequence;

predicting, in a sliding process of the sliding window, each time a quantity of clock speeds in the sliding window is greater than or equal to a preset quantity, and based on a clock speed in the sliding window at a current moment and a fitting result obtained through previous fitting, a predicted clock speed at a next moment;

when a difference between the predicted clock speed at the next moment and a clock speed to be added to the sliding window is less than or equal to a first preset threshold, after the clock speed to be added to the sliding window is added to the sliding window, obtaining, through fitting based on the clock speed in the sliding window, a current clock speed change rate, and obtaining a fitting residual;

using, when the fitting residual is less than or equal to a second preset threshold, the current clock speed change rate as the clock speed change rate;

when the fitting residual is greater than the second preset threshold, resetting the sliding window and making the sliding window continue to slide forward until the clock speed time sequence is traversed or the fitting residual is less than or equal to the second preset threshold; and when the difference between the clock speed at the next moment and the clock speed to be added to the sliding window is greater than the first preset threshold, resetting the sliding window and making the sliding window continue to slide forward until the clock speed time sequence is traversed or the fitting residual is less than or equal to the second preset threshold.

7. The method of claim 1, wherein the positioning process comprises obtaining a position and a speed of the terminal device.

8. An apparatus, comprising:

a memory configured to store instructions; and one or more processors coupled to the memory and configured to execute the instructions to:

receive, from a terminal device, a positioning request;

obtain, in response to the positioning request, obtain historical satellite clock error data of a preset time period, wherein the historical satellite clock error data comprises broadcast ephemeris clock error data and precise ephemeris clock error data;

correct, based on the broadcast ephemeris clock error data, a reference deviation of the precise ephemeris clock error data to obtain corrected precise ephemeris clock error data;

obtain, through fitting based on single-day clock error data in the corrected precise ephemeris clock error data, a single-day clock speed of a satellite;

obtain, based on the single-day clock speed, a clock speed time sequence of the satellite;

obtain, through fitting based on the clock speed time sequence, a clock speed change rate of the satellite;

obtain, based on an initial clock error value, a clock speed, and the clock speed change rate, a predicted clock error of the satellite in a preset future time period; and send, to the terminal device, the predicted clock error to instruct the terminal device to perform a positioning process.

9. The apparatus of claim 8, wherein the one or more processors are further configured to execute the instructions to:

calculate a first difference between a broadcast ephemeris clock error sequence and a precise ephemeris clock error sequence of an epoch to obtain a difference sequence of the epoch, wherein the broadcast ephemeris clock error data comprises broadcast ephemeris clock error sequences of epochs, and wherein the precise ephemeris clock error data comprises precise ephemeris clock error sequences of the epoch;

calculate an average value and a standard deviation of the difference sequence;

remove, from the difference sequence based on the average value and the standard deviation, a difference point that does not meet a preset condition to obtain a target difference sequence;

calculate, based on the target difference sequence, an updated reference deviation; and calculate a second difference between the precise ephemeris clock error data and the updated reference deviation to obtain the corrected precise ephemeris clock error data.

10. The apparatus of claim 9, wherein the one or more processors are further configured to execute the instructions to calculate the reference deviation by using an equation:

$$b(t) = \frac{1}{N}\sum_{i=1}^{i=N} dclk_i,$$

wherein N is a quantity of clock error difference points comprised in the target difference sequence, b(t) is the reference deviation, and $dclk_i$ is an $i^{th}$ clock error difference point in the target difference sequence.

11. The apparatus of claim 9, wherein the one or more processors are further configured to execute the instructions to:

calculate, based on the average value and the standard deviation, whether each difference point in the difference sequence satisfies a formula:

$$\left|\frac{x-\mu}{\delta}\right| > 3,$$

wherein X is the difference point in the difference sequence, μ is the average value of the difference sequence, and δ is the standard deviation of the difference sequence;

remove, when the difference point satisfies the formula, the difference point from the difference sequence to obtain an updated difference sequence after elimination of the difference point;

calculate an updated average value and an updated standard deviation of the updated difference sequence; and after the updated average value and the updated standard deviation are calculated:

use the updated difference sequence as the difference sequence;

return to the step of calculating, based on the updated average value and the updated standard deviation, whether each difference point in the updated difference sequence satisfies the formula until no difference point in the updated difference sequence satisfied the formula; and use the updated difference sequence as the target difference sequence.

12. The apparatus of claim 9, wherein the one or more processors are further configured to execute the instructions to:

perform coarse difference detection on the single-day clock error data to obtain updated single-day clock error data; and obtain, through fitting based on the updated single-day clock error data, the single-day clock speed.

13. The apparatus of claim 9, wherein the one or more processors are further configured to execute the instructions to:

fit, by using a sliding window, the clock speed time sequence;

predict, in a sliding process of the sliding window, each time a quantity of clock speeds in the sliding window is greater than or equal to a preset quantity, and based on a clock speed in the sliding window at a current moment and a fitting result obtained through previous fitting, a predicted clock speed at a next moment;

when a difference between the predicted clock speed at the next moment and a clock speed to be added to the sliding window is less than or equal to a first preset threshold, after the clock speed to be added to the sliding window is added to the sliding window, obtain, through fitting based on the clock speed in the sliding window, a current clock speed change rate, and obtain a fitting residual;

use, when the fitting residual is less than or equal to a second preset threshold, the current clock speed change rate as the clock speed change rate;

when the fitting residual is greater than the second preset threshold, reset the sliding window and make the sliding window continue to slide forward until the clock speed time sequence is traversed or the fitting residual is less than or equal to the second preset threshold; and when the difference between the clock speed at the next moment and the clock speed to be added to the sliding window is greater than the first preset threshold, reset the sliding window and make the sliding window continue to slide forward until the clock speed time sequence is traversed or the fitting residual is less than or equal to the second preset threshold.

14. The apparatus of claim 8, wherein the satellite comprises a plurality of satellites.

15. A computer program product comprising instructions stored on a non-transitory computer-readable medium that, when executed by one or more processors, cause an apparatus to:

receive, from a terminal device, a positioning request;

obtain historical satellite clock error data of a preset time period, wherein the historical satellite clock error data comprises broadcast ephemeris clock error data and precise ephemeris clock error data;

correct, based on the broadcast ephemeris clock error data, a reference deviation of the precise ephemeris clock error data to obtain corrected precise ephemeris clock error data;

obtain, through fitting based on single-day clock error data in the corrected precise ephemeris clock error data, a single-day clock speed of a satellite;

obtain, based on the single-day clock speed, a clock speed time sequence of the satellite;

obtain, through fitting based on the clock speed time sequence, a clock speed change rate of the satellite;

obtain, based on an initial clock error value, a clock speed, and the clock speed change rate, a predicted clock error of the satellite in a preset future time period; and send, to the terminal device, the predicted clock error to instruct the terminal device to perform a positioning process.

16. The computer program product of claim 15, wherein the one or more processors are further configured to execute the instructions to:

calculate a first difference between a broadcast ephemeris clock error sequence and a precise ephemeris clock error sequence of an epoch to obtain a difference sequence of the epoch, wherein the broadcast ephemeris clock error data comprises broadcast ephemeris clock error sequences of epochs, and wherein the precise ephemeris clock error data comprises precise ephemeris clock error sequences of the epoch;

calculate an average value and a standard deviation of the difference sequence;

remove, from the difference sequence based on the average value and the standard deviation, a difference point that does not meet a preset condition, to obtain a target difference sequence;

calculate, based on the target difference sequence, an updated reference deviation; and calculate a second difference between the precise ephemeris clock error data and the updated reference deviation to obtain the corrected precise ephemeris clock error data.

17. The computer program product of claim 16, wherein the one or more processors are further configured to execute the instructions to: calculate the reference deviation by using an equation:

$$b(t) = \frac{1}{N} \sum_{i=1}^{i=N} dclk_i,$$

wherein N is a quantity of clock error difference points comprised in the target difference sequence, b(t) is the reference deviation, and $dclk_i$ is an $i^{th}$ clock error difference point in the target difference sequence.

18. The computer program product of claim 16, wherein the one or more processors are further configured to execute the instructions to:

calculate, based on the average value and the standard deviation, whether each difference point in the difference sequence satisfies a formula:

$$\left| \frac{x - \mu}{\delta} \right| > 3,$$

wherein x is the difference point in the difference sequence, μ is the average value of the difference sequence, and δ is the standard deviation of the difference sequence;

remove, when the difference point satisfies the formula, the difference point from the difference sequence to obtain an updated difference sequence after elimination of the difference point;

calculate an updated average value and an updated standard deviation of the updated difference sequence; and after the updated average value and the updated standard deviation are calculated:

use the updated difference sequence as the difference sequence;

return to the step of calculating, based on the updated average value and the updated standard deviation, whether each difference point in the updated difference sequence satisfies the formula until no difference point in the updated difference sequence satisfies the formula; and use the updated difference sequence as the target difference sequence.

19. The computer program product of claim 15, wherein the one or more processors are further configured to execute the instructions to:

perform coarse difference detection on the single-day clock error data to obtain updated single-day clock error data; and obtain, through fitting based on the updated single-day clock error data, the single-day clock speed.

20. The computer program product of claim 15, wherein the one or more processors are further configured to execute the instructions to:

fit, by using a sliding window, the clock speed time sequence;

predict, in a sliding process of the sliding window, each time a quantity of clock speeds in the sliding window is greater than or equal to a preset quantity, and based on a clock speed in the sliding window at a current moment and a fitting result obtained through previous fitting, a predicted clock speed at a next moment;

when a difference between the predicted clock speed at the next moment and a clock speed to be added to the sliding window is less than or equal to a first preset threshold, after the clock speed to be added to the sliding window is added to the sliding window, obtain, through fitting based on the clock speed in the sliding window, a current clock speed change rate, and obtain a fitting residual;

use, when the fitting residual is less than or equal to a second preset threshold, the current clock speed change rate as the clock speed change rate;

reset, when the fitting residual is greater than the second preset threshold, the sliding window and making the sliding window continue to slide forward until the clock speed time sequence is traversed or the fitting residual is less than or equal to the second preset threshold; and reset, when the difference between the clock speed at the next moment and the clock speed to be added to the sliding window is greater than the first preset threshold, the sliding window and making the sliding window continue to slide forward until the clock speed time sequence is traversed or the fitting residual is less than or equal to the second preset threshold.

21. The computer program product of claim 15, wherein the satellite comprises a plurality of satellites.

* * * * *